United States Patent
Seo et al.

(10) Patent No.: US 12,346,519 B2
(45) Date of Patent: Jul. 1, 2025

(54) DISPLAY DEVICE

(71) Applicant: SAMSUNG DISPLAY CO., LTD., Yongin-si (KR)

(72) Inventors: Jung Deok Seo, Yongin-si (KR); Seung Kyu Lee, Yongin-si (KR); Yun Seong Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 201 days.

(21) Appl. No.: 18/175,384

(22) Filed: Feb. 27, 2023

(65) Prior Publication Data

US 2023/0367419 A1 Nov. 16, 2023

(30) Foreign Application Priority Data

May 10, 2022 (KR) .......................... 10-2022-0057437

(51) Int. Cl.
*G06F 3/041* (2006.01)
*G09G 3/32* (2016.01)
*G09G 3/3266* (2016.01)

(52) U.S. Cl.
CPC ........... *G06F 3/04166* (2019.05); *G09G 3/32* (2013.01); *G09G 3/3266* (2013.01); *G09G 2310/0267* (2013.01)

(58) Field of Classification Search
CPC .... G06F 3/041; G06F 3/0412; G06F 3/04166; G06F 3/04184; G06F 3/0446; G09G 3/32; G09G 3/3208; G09G 3/3233; G09G 3/3266; G09G 3/36; G09G 2310/0202; G09G 2310/0224; G09G 2310/0267; G09G 2310/08; G09G 2330/06; G09G 2360/14
See application file for complete search history.

(56) References Cited

U.S. PATENT DOCUMENTS

| | | | |
|---|---|---|---|
| 9,189,113 B2 | 11/2015 | Yoshimura | |
| 9,761,178 B2 | 9/2017 | Park et al. | |
| 2014/0071062 A1 | 3/2014 | Fang | |
| 2015/0341706 A1* | 11/2015 | Yun | H04N 21/8146 725/131 |
| 2017/0228087 A1* | 8/2017 | Liu | G06F 3/0443 |
| 2021/0295780 A1* | 9/2021 | Ikeda | G09G 3/3266 |

FOREIGN PATENT DOCUMENTS

| | | | | |
|---|---|---|---|---|
| EP | 1667092 A1 * | 6/2006 | | G09G 3/20 |
| KR | 10-2013-0136671 | 12/2013 | | |
| KR | 10-2016-0050166 | 5/2016 | | |
| KR | 10-2016-0142882 | 12/2016 | | |
| KR | 10-2278325 | 7/2021 | | |
| WO | 2015-187329 | 12/2015 | | |

* cited by examiner

Primary Examiner — Stacy Khoo
(74) Attorney, Agent, or Firm — F. CHAU & ASSOCIATES, LLC

(57) ABSTRACT

A display device includes a display panel. The display panel includes pixels connected to gate lines and data lines. A sensor overlaps the display panel. A gate driver is configured to provide a gate signal to the gate lines. In a first mode, the gate driver provides the gate signal to the gate lines using progressive scanning. In a second mode, the gate driver provides the gate signal using interlaced scanning, and the sensor operates in a period allocated between periods in which a first interlaced scanning operation and a second interlaced scanning operation are performed within one frame period.

19 Claims, 20 Drawing Sheets

IMAGE3

IMAGE2

DISPLAY DEVICE

CROSS-REFERENCE TO RELATED APPLICATIONS

This application claims priority under 35 U.S.C. § 119 to Korean Patent Application No. 10-2022-0057437, filed on May 10, 2022, the disclosure of which is incorporated by reference herein in its entirety.

TECHNICAL FIELD

Embodiments of the disclosure relate to a display device.

DISCUSSION OF RELATED ART

As advances are made in information technology, the use of display devices to communicate information to a user is increasing. Such display devices may include a display unit that displays an image and a sensor unit that senses a touch position.

SUMMARY

To more naturally express a touch input result (for example, writing using a stylus pen) in real time, a sensing period of a sensor unit may be shortened.

When the sensing period of the sensor unit is shorter than an image refresh period of a display unit, in particular, when the sensor unit performs a sensing operation while an image is displayed on the display unit, interference may occur in the image due to the sensing operation of the sensing unit, and display quality may be degraded.

An object of the disclosure is to provide a display device capable of sensing a touch input without degrading display quality.

According to embodiments of the disclosure, a display device includes a display panel including pixels connected to gate lines and data lines, a sensor that overlaps the display panel, and a gate driver configured to provide a gate signal to the gate lines. In a first mode, the gate driver provides the gate signal to the gate lines using progressive scanning. In a second mode, the gate driver provides the gate signal using interlaced scanning, and the sensor operates in a period allocated between periods in which a first interlaced scanning operation and a second interlaced scanning operation are performed within one frame period.

The gate lines may include first gate lines and second gate lines which are alternately arranged, and the gate signal may include a first gate signal and a second gate signal. The gate driver may include a first gate driver configured to sequentially provide the first gate signal to the first gate lines in response to a first start signal, and a second gate driver configured to sequentially provide the second gate signal to the second gate lines in response to a second start signal. The first gate signal may be sequentially provided to the first gate lines in a first period of a second mode, and the second gate signal may be sequentially provided to the second gate lines in a second period of the second mode after the first period.

The first gate lines may be odd-numbered gate lines, and the second gate lines may be even-numbered gate lines.

A pulse of the first start signal and a pulse of the second start signal may be generated in different periods in the second mode.

The pulse of the first start signal and the pulse of the second start signal may be generated in the same period in the first mode.

The gate driver may operate in the second mode when the sensor senses a touch input, and the gate driver may operate in the first mode when the sensor does not sense the touch input.

The gate driver may operate in the second mode when an input device interlocked with the sensor is activated, and the gate driver may operate in the first mode when the input device is deactivated.

A frame period of the second mode may include a first period, a second period, a third period, and a fourth period sequentially arranged, the first interlaced scanning operation may be performed in the first period, the second interlaced scanning operation may be performed in the third period, and the sensor may operate in the second period and the fourth period.

A second driving period of the sensor in the second mode may be different from a first driving period of the sensor in the first mode.

The gate driver may generate the gate signal based on a clock signal, and a second frequency of the clock signal in the second mode may be different from a first frequency of the clock signal in the first mode.

The second frequency of the clock signal in the second mode may be greater than the first frequency of the clock signal in the first mode.

A pulse width of the clock signal in the second mode may be the same as a pulse width of the clock signal in the first mode.

A pulse width of the clock signal in the second mode may be different from a pulse width of the clock signal in the first mode.

A refresh rate of an image displayed through the display panel may be the same in the first mode and in the second mode.

According to embodiments of the disclosure, a display device includes a display panel including pixels connected to gate lines and data lines, a sensor that overlaps the display panel, and a gate driver configured to provide the gate signal to the gate lines. The gate lines are divided into first gate lines disposed in a first area of the display panel and second gate lines disposed in a second area of the display panel. In a first mode, the gate driver provides a gate signal to the gate lines during one continuous period within a frame period, and the sensor does not operate during the one continuous period. In a second mode, the gate driver provides the gate signal to the first gate lines in a first period within one frame period, and provides the gate signal to the second gate lines in a third period within the one frame period, and the sensor operates in a second period between the first period and the third period.

The gate driver may operate in the second mode when the sensor senses a touch input, and the gate driver may operate in the first mode when the sensor does not sense the touch input.

The gate driver may operate in the second mode when an input device interlocked with the sensor is activated, and the gate driver may operate in the first mode when the input device is deactivated.

A frame period of the second mode may include the first period, the second period, the third period, and a fourth period sequentially arranged, a scanning operation may be performed in the first period and the third period, and the sensor may operate in the second period and the fourth period.

A second driving period of the sensor in the second mode may be different from a first driving period of the sensor in the first mode.

A refresh rate of an image displayed through the display panel may be the same in the first mode and the second mode.

The display device according to the embodiments of the disclosure may perform mode switching between the first mode and the second mode based on whether interlocked with an external input device or whether a touch input occurs, and may vary the number of blank periods (that is, periods in which a touch scan operation may be performed) in one frame. Therefore, the display device may sense the touch input at a higher driving frequency and display a touch input result more quickly and naturally.

In addition, the display device according to an embodiment of the disclosure may operate using progressive scanning in the first mode in which the touch input is not sensed, and may operate using interlaced scanning in the second mode in which the touch input is sensed. Therefore, degradation of display quality may be prevented or reduced.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
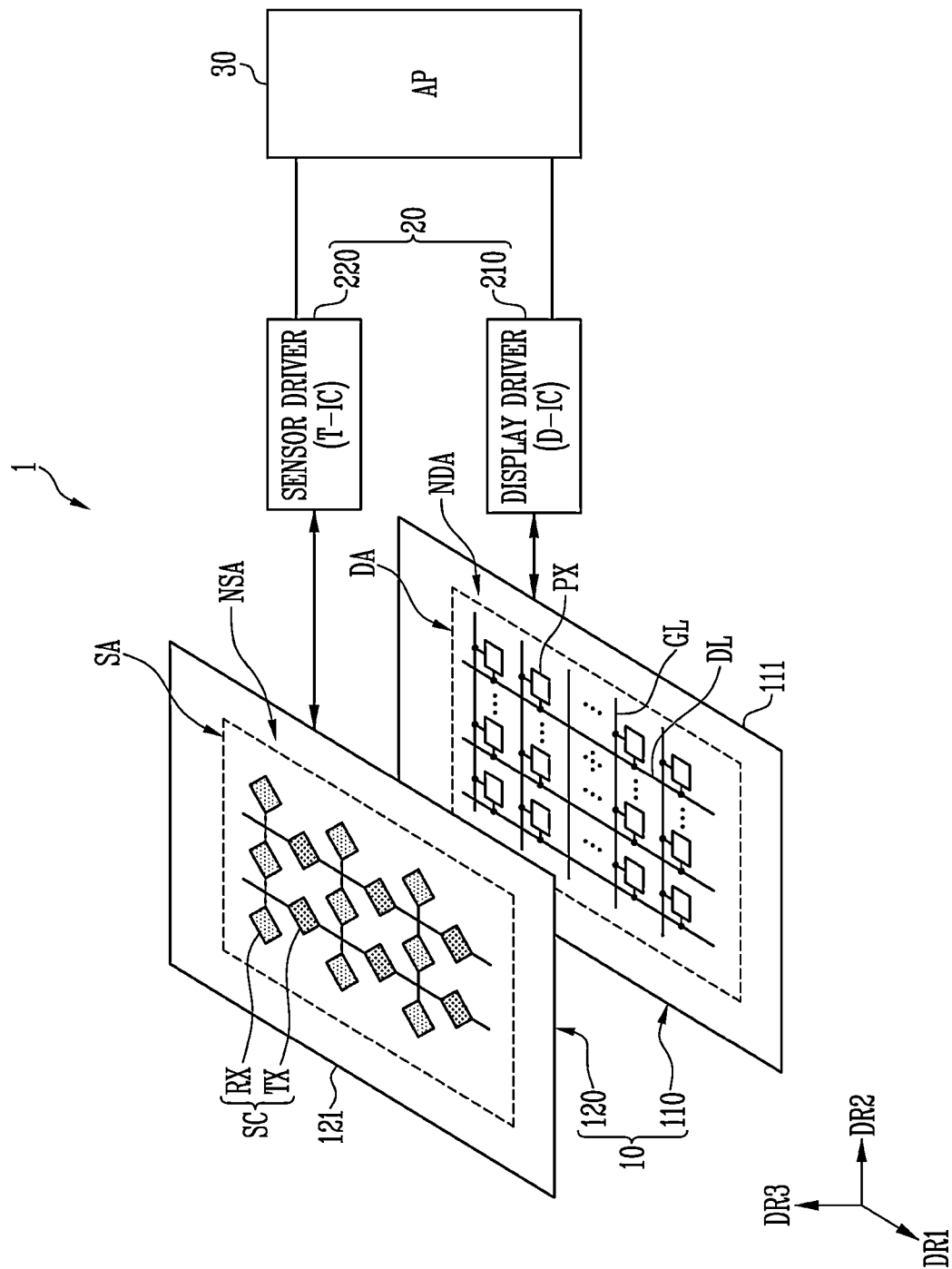
FIG. 1 is a diagram illustrating a display device according to embodiments of the disclosure.

Embodiments of the disclosure will be described more fully hereinafter with reference to the accompanying drawings. Like reference numerals may refer to like elements throughout the accompanying drawings.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the disclosure. In addition, in some embodiments, the block, unit and/or module may be physically combined into more complex blocks, units, and/or modules without departing from the scope of the disclosure.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

FIG. 1 is a diagram illustrating a display device according to embodiments of the disclosure.

Referring to FIG. 1, the display device 1 may include a panel 10 and a driving circuit unit 20 that drives the panel 10. In addition, the display device 1 may further include an application processor 30 or may be connected to the application processor 30.

The panel 10 may include a display unit 110 (a display panel, or a display layer) that displays an image and a sensor unit 120 (a sensor panel, a sensor layer, or a sensor) that senses touch, pressure, fingerprint, hovering, and the like. For example, the panel 10 may include a pixel PX and sensors SC positioned to overlap at least a portion of the pixel PX in a third direction DR3. In an embodiment, the sensors SC may include first sensors TX (or a driving electrode) and second sensors RX (or a sensing electrode). In an embodiment (for example, in an embodiment that utilizes a self-capacitance method), the sensors SC may be configured as one type of sensors without distinction between the first and second sensors RX and RX.

The driving circuit unit 20 may include a display driver 210 that drives the display unit 110 and a sensor driver 220 that drives the sensor unit 120. For example, the pixel PX may display an image in a display frame period unit. For example, the sensors SC may sense an input of a user in a sensing frame period unit. A sensing frame period and a display frame period may be independent of each other and may be different from each other. The sensing frame period and the display frame period may be synchronized with each other or may be asynchronous.

According to an embodiment, the display unit 110 and the sensor unit 120 may be separately manufactured, and then disposed and/or combined so that at least one area overlaps each other. Alternatively, in an embodiment, the display unit 110 and the sensor unit 120 may be integrally manufactured. For example, the sensor unit 120 may be directly formed on at least one substrate configuring the display unit 110 (for example, an upper substrate and/or a lower substrate of the display panel, or a thin film encapsulation layer), or other insulating layers or various functional layer (for example, an optical layer or a protective layer).

In FIG. 1, the sensor unit 120 is disposed on a front surface (for example, an upper surface on which an image is displayed) of the display unit 110, but a position of the sensor unit 120 is not limited thereto. For example, in an embodiment, the sensor unit 120 may be disposed on a back surface or both surfaces of the display unit 110. In an embodiment, the sensor unit 120 may be disposed on at least one edge area of the display unit 110.

The display unit 110 may include a display substrate 111 and a plurality of pixels PX formed on the display substrate 111. The pixel PX may be disposed in a display area DA of the display substrate 111.

The display substrate 111 may include a display area DA where an image is displayed and a non-display area NDA outside the display area DA. According to an embodiment, the display area DA may be disposed in a center area of the display unit 110, and the non-display area NDA may be disposed in an edge area of the display unit 110 and surrounds the display area DA.

The display substrate 111 may be a rigid substrate or a flexible substrate, and a material or a physical property thereof is not particularly limited. For example, the display substrate 111 may be a rigid substrate configured of glass or tempered glass, or a flexible substrate configured of a thin film of a plastic or metal material.

A gate line GL, a data line DL, and the pixel PX connected to the gate line GL and the data line DL are disposed in the display area DA. The pixel PX is selected by a gate signal of a turn-on level supplied from the gate line GL, receives a data signal from the data line DL, and emits light of a luminance corresponding to the data signal. Therefore, an image corresponding to the data signal is displayed in the display area DA. In the disclosure, a structure, a driving method, and the like of the pixel PX are not particularly limited. For example, the pixel PX may be implemented with a pixel employing various currently known structures and driving methods.

In the non-display area NDA, various lines and/or a built-in circuit unit connected to the pixel PX of the display area DA may be disposed. For example, a plurality of lines that supply various power and control signals to the display area DA may be disposed in the non-display area NDA, and a scan driver or the like may be further disposed in the non-display area NDA.

In the disclosure, a type of the display unit 110 is not particularly limited. For example, the display unit 110 may be implemented as a self-emission type display panel such as an organic light emitting display panel. However, when the display unit 110 is implemented as a self-emission type, the pixel PX is not limited to a case where only the organic light emitting element is included. For example, the light emitting element of the pixel PX may be configured of an organic light emitting diode, an inorganic light emitting diode, a quantum dot/well light emitting diode, or the like. A plurality of light emitting elements may be provided in the pixel PX. The plurality of light emitting elements may be connected in series, parallel, series-parallel, or the like. Alternatively, the display unit 110 may be implemented as a non-emission type display panel such as a liquid crystal display panel. When the display unit 110 is implemented as a non-emission type, the display device 1 may additionally include a light source such as a backlight unit.

The sensor unit 120 includes a sensor substrate 121 and a plurality of sensors formed on the sensor substrate 121. The sensors may be disposed in a sensing area SA on the sensor substrate 121.

The sensor substrate 121 may include the sensing area SA in which a touch input or the like may be sensed, and a peripheral area NSA outside the sensing area SA. According to an embodiment, the sensing area SA may be disposed to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when a touch input or the like is provided on the display area DA, the touch input may be detected through the sensor unit 120.

The sensor substrate 121 may be a rigid or flexible substrate, and may be configured of at least one insulating layer. In addition, the sensor substrate 121 may be a transparent or translucent light-transmitting substrate, but is not limited thereto. That is, in the disclosure, a material and a physical property of the sensor substrate 121 are not particularly limited. For example, the sensor substrate 121 may be a rigid substrate configured of glass or tempered glass, or a flexible substrate configured of a thin film of a plastic or metal material. In addition, according to an embodiment, at least one substrate (for example, the display substrate 111, an encapsulation substrate and/or a thin film encapsulation layer) configuring the display unit 110, an insulating layer, a functional layer, or the like of at least one layer disposed in an inside and/or on an outer surface of the display unit 110 may be used as the sensor substrate 121.

The sensing area SA is set as an area capable of responding to the touch input (that is, an active area of a sensor). To this end, the sensors SC for sensing the touch input or the like may be disposed in the sensing area SA. According to an embodiment, the sensors SC may include the first sensors TX and the second sensors RX.

For example, each of the first sensors TX may extend in a first direction DR1. The first sensors TX may be arranged in a second direction DR2. The second direction DR2 may be different from the first direction DR1. For example, the second direction DR2 may be a direction orthogonal to the first direction DR1. In an embodiment, an extension direction and an arrangement direction of the first sensors TX may follow another conventional configuration. Each of the first sensors TX may have a form in which first cells (or driving electrodes) of a relatively large area and first bridges of a relatively narrow area may be connected. In FIG. 1, each of the first cells is shown in a diamond shape, but each of the first cells may be configured in various conventional shapes such as, for example, a circle, a quadrangle, a triangle, and a mesh form. For example, the first bridges may be integrally formed on the same layer as the first cells. In an embodiment, the first bridges may be formed on a layer different from that of the first cells and may electrically connect adjacent first cells.

For example, each of the second sensors RX may extend in the second direction DR2. The second sensors RX may be arranged in the first direction DR1. In an embodiment, an extension direction and an arrangement direction of the second sensors RX may follow another conventional configuration. Each of the second sensors RX may have a form in which second cells (or sensing electrodes) of a relatively large area and second bridges of a relatively narrow area are connected. In FIG. 1, each of the second cells is shown in a diamond shape, but may be configured in various conventional shapes such as, for example, a circle, a quadrangle, a triangle, and a mesh form. For example, the second bridges may be integrally formed on the same layer as the second cells. In an embodiment, the second bridges may be formed in a layer different from that of the second cells and may electrically connect adjacent second cells.

According to an embodiment, each of the first sensors TX and the second sensors RX may have conductivity by including at least one of a metal material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), and platinum (Pt), or an alloy thereof. In an embodiment, the first sensors TX and the second sensors RX may be configured in a mesh form. In addition, the first sensors TX and the second sensors RX may include at least one of various transparent conductive materials including, for example, silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), carbon nano tube, graphene, and the like. In addition, the first sensors TX and the second sensors RX may have conductivity by including at least one of various conductive materials. In addition, each of the first sensors TX and the second sensors RX may be formed of a single layer or multiple layers, and a cross-sectional structure thereof is not particularly limited.

The sensor lines for electrically connecting the first and second sensors TX and RX to the sensor driver 220 and the like may be primarily disposed in the peripheral area NSA of the sensor unit 120.

The driving circuit unit 20 may include the display driver 210 that drives the display unit 110 and the sensor driver 220 that drives the sensor unit 120. In an embodiment, the display driver 210 and the sensor driver 220 may be configured of integrated chips (ICs) separated from each other. In an embodiment, at least a portion of the display driver 210 and the sensor driver 220 may be integrated together in one IC.

The display driver 210 is electrically connected to the display unit 110 and drives the pixel PX. For example, the display driver 210 may include a data driver and a timing controller, and the scan driver may be separately mounted in the non-display area NDA of the display unit 110. In an embodiment, the display driver 210 may include all or at least a portion of the data driver, the timing controller, and the scan driver. The display driver 210 Is described further below with reference to FIG. 3.

The sensor driver 220 is electrically connected to the sensor unit 120 and drives the sensor unit 120. The sensor driver 220 may include a sensor transmitter and a sensor receiver. According to an embodiment, the sensor transmitter and the sensor receiver may be integrated in one IC, but are not limited thereto.

The application processor 30 may be electrically connected to the display driver 210, and may provide grayscales and timing signals for the display frame period to the display driver 210. In addition, the application processor 30 may be electrically connected to the sensor driver 220 and may receive a sensing signal from the sensor driver 220. The application processor 30 may sense touch, pressure, fingerprint, hovering, and the like based on the sensing signal. The application processor 30 may correspond to at least one of a graphics processing unit (GPU), a central processing unit (CPU), an application processor (AP), and the like.

In an embodiment, the application processor 30 may be interlocked with an external input device (for example, a stylus pen, for example, an active electrostatic (AES) pen), and may control an operation of the display driver 210 and the sensor driver 220 according to whether the application processor 30 is interlocked with the input device. For example, when the application processor 30 (or the display device 1) is not interlocked with the external input device or the input device is not activated (or deactivated), the application processor 30 may operate the display driver 210 and the sensor driver 220 in a first mode (or a normal mode), and when the application processor 30 (or the display device 1) is interlocked with the external input device or the input device is activated, the application processor 30 may operate the display driver 210 and the sensor driver 220 in a second mode (or a touch mode). The first mode and the second mode are described further below with reference to FIGS. 7 and 10.

In an embodiment, the application processor 30 may control an operation of the display driver 210 and the sensor driver 220 according to whether a touch input is generated.

For example, when the touch input is not sensed, the application processor 30 may operate the display driver 210 and the sensor driver 220 in the first mode, and when the touch input is sensed through the sensor unit 120, the application processor 30 may operate the display driver 210 and the sensor driver 220 in the second mode.

Figure 2:
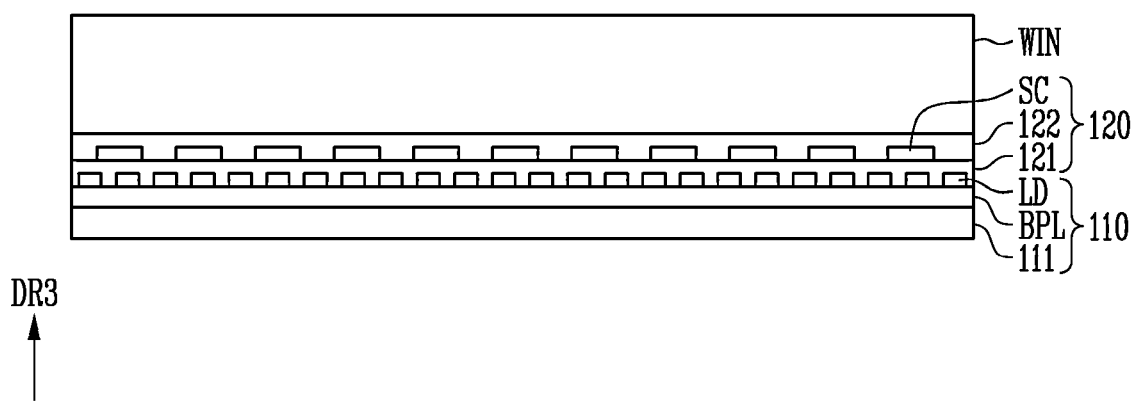
FIG. 2 is a cross-sectional view illustrating an embodiment of the display device of FIG. 1.

FIG. 2 is a cross-sectional view illustrating an embodiment of the display device of FIG. 1.

Referring to FIGS. 1 and 2, the sensor unit 120 may be stacked on the display unit 110. In addition, a window WIN may be stacked on the sensor unit 120.

The display unit 110 may include the display substrate 111, a circuit element layer BPL formed on the display substrate 111, and a light emitting element LD formed on the circuit element layer BPL. The circuit element layer BPL may include pixel circuits (for example, a transistor and a capacitor) that drives the light emitting element LD of the pixel PX, the gate line GL, the data line DL, and the like.

The sensor unit 120 may include the sensor substrate 121, the sensors SC formed on the sensor substrate 121, and a protective layer 122 covering the sensors SC. In the embodiment of FIG. 2, the sensor substrate 121 is shown in a form of an encapsulation layer covering the pixel PX. In an embodiment, the sensor substrate 121 may exist separately from the encapsulation layer covering the pixel PX.

The window WIN may be a protection member disposed on the uppermost end of a module of the display device 1, and may be a substantially transparent light-transmitting substrate. The window WIN may have a multilayer structure selected from, for example, a glass substrate, a plastic film, and a plastic substrate. The window WIN may include a rigid or flexible substrate, and a configuration material of the window WIN is not particularly limited.

In an embodiment, the display device 1 may further include a polarizing plate (or other type of antireflection layer), which may prevent or reduce reflection of external light between the window WIN and the sensor unit 120.

Figure 3:
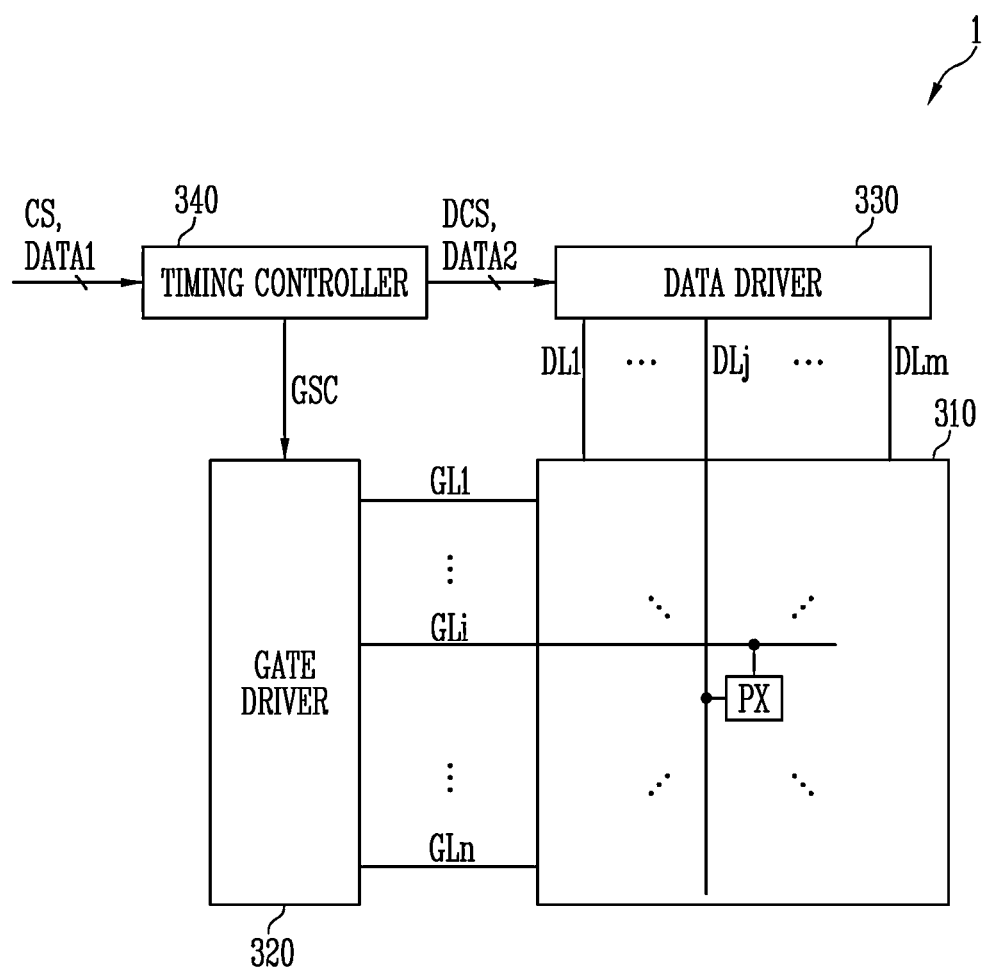
FIG. 3 is a diagram illustrating an embodiment of the display device of FIG. 1.

FIG. 3 is a diagram illustrating an embodiment of the display device of FIG. 1. In FIG. 3, the display device 1 is shown based on a configuration for displaying an image (that is, a configuration corresponding to the display unit 110 and the display driver 210 of FIG. 1).

Referring to FIGS. 1 and 3, the display device 1 may include a display panel 310, a gate driver 320 (or a scan driver), a data driver 330 (or a source driver), and a timing controller 340. The display panel 310 may be substantially the same as the display unit 110 of FIG. 1, and at least one of the gate driver 320, the data driver 330, and the timing controller 340 may be included in the display driver 210 of FIG. 1.

The display panel 310 may include gate lines GL1 to GLn (where n is a positive integer), data lines DL1 to DLm (where m is a positive integer), and the pixel PX.

The pixel PX may be disposed in an area (for example, a pixel area) partitioned by the gate lines GL1 to GLn and the data lines DL1 to DLm.

The pixel PX may be connected to the gate lines GL1 to GLn and the data lines DL1 to DLm. In describing an embodiment of the disclosure, the term "connection" may refer to an electrical and/or physical connection inclusively. For example, a pixel PX disposed in an i-th pixel row and a j-th pixel column may be connected to an i-th gate line gLi and a j-th data line DLj. Here, i is a positive integer less than or equal to n, and j is a positive integer less than or equal to m.

The pixel PX may emit light with a luminance corresponding to a data signal provided through the data lines DL1 to DLm in response to a gate signal provided through the gate lines GL1 to GLn.

The gate driver 320 may generate the gate signal (for example, a gate signal of a turn-on level) based on a gate control signal GCS (or a scan control signal), and sequentially provide the gate signal to the gate lines GL1 to GLn. The gate control signal GCS may include a start signal, a clock signal, and the like, and may be provided from the timing controller 340. For example, the gate driver 320 may include a shift register (or a stage) that sequentially outputs a gate signal of a pulse shape corresponding to the start signal using the clock signal.

The data driver 330 may generate data signals based on image data DATA2 and a data control signal DCS provided from the timing controller 340, and provide the data signals to the display panel 310 (or the pixel PX). Here, the data control signal DCS may be a signal that controls an operation of the data driver 330, and may include a load signal (or a data enable signal), a vertical synchronization signal, a horizontal synchronization signal, and the like instructing an output of a valid data signal.

The timing controller 340 may receive input image data DATA1 and a control signal CS from outside of the timing controller 340 (for example, from the application processor 30 (refer to FIG. 1)), generate the gate control signal GCS and the data control signal DCS based on the control signal CS, and convert the input image data DATA1 to generate the image data DATA2. For example, the timing controller 340 may convert input image data DATA1 of an RGB format into image data DATA2 of an RGBG format matching a pixel arrangement in the display panel 310.

In embodiments, at least one of the gate driver 320, the data driver 330, and the timing controller 340 may be formed on the display panel 310, or may be implemented as an integrated circuit (IC) and connected to the display panel 310 through a flexible circuit board. In addition, at least two of the gate driver 320, the data driver 330, and the timing controller 340 may be implemented as one IC.

In embodiments, the gate driver 320 may provide the gate signal to the gate lines GL1 to GLn using progressive scanning in the first mode, and provide the gate signal to the gate lines GL1 to GLn using interlaced scanning in the second mode. When the gate driver 320 provides the gate signals to the gate lines GL1 to GLn using progressive scanning (e.g., using a progressive scanning method), this may also be referred to as a progressive scanning mode. Thus, the first mode may correspond to a progressive scanning mode according to embodiments of the disclosure. When the gate driver 320 provides the gate signals to the gate lines GL1 to GLn using interlaced scanning (e.g., using an interlaced scanning method), this may also be referred to as an interlaced scanning mode. Thus, the second mode may correspond to an interlaced scanning mode according to embodiments of the disclosure. A specific configuration of the gate driver 320 for this is described with reference to FIGS. 4 and 5.

Figure 4:
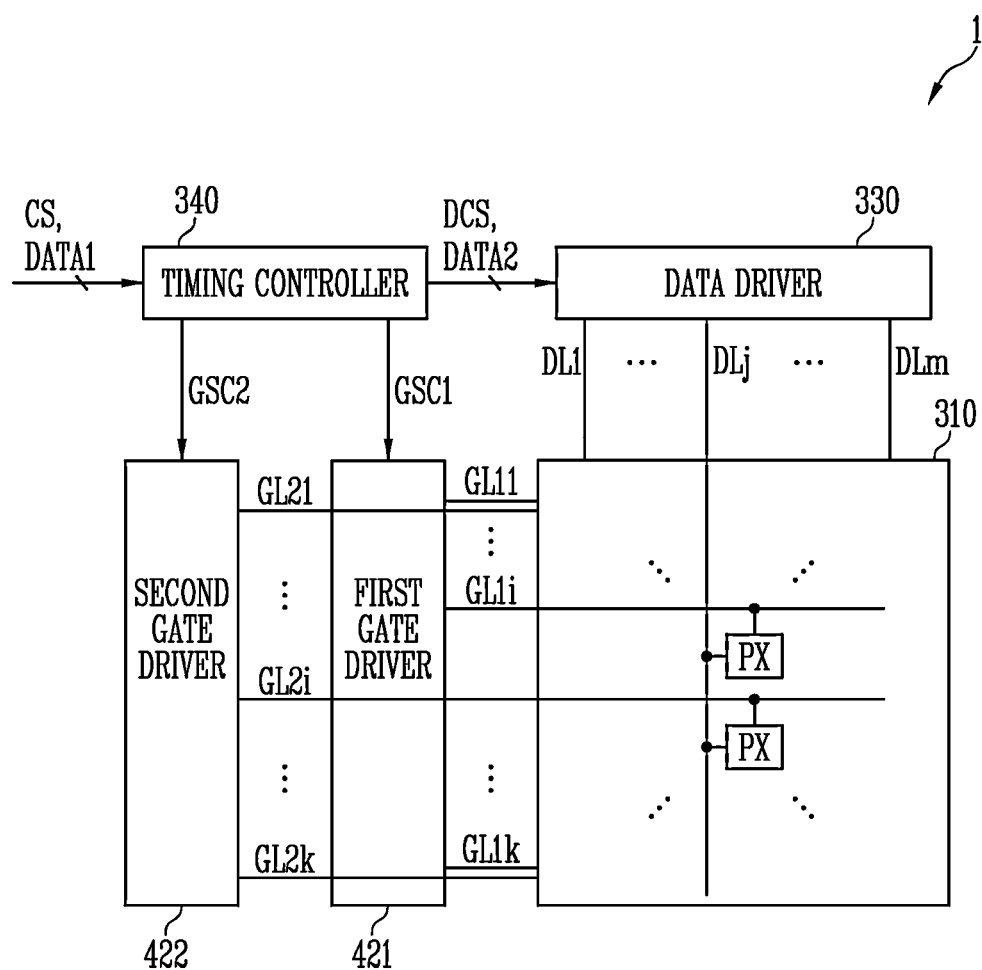
FIGS. 4 and 5 are diagrams illustrating an embodiment of the display device of FIG. 3.
Figure 5:
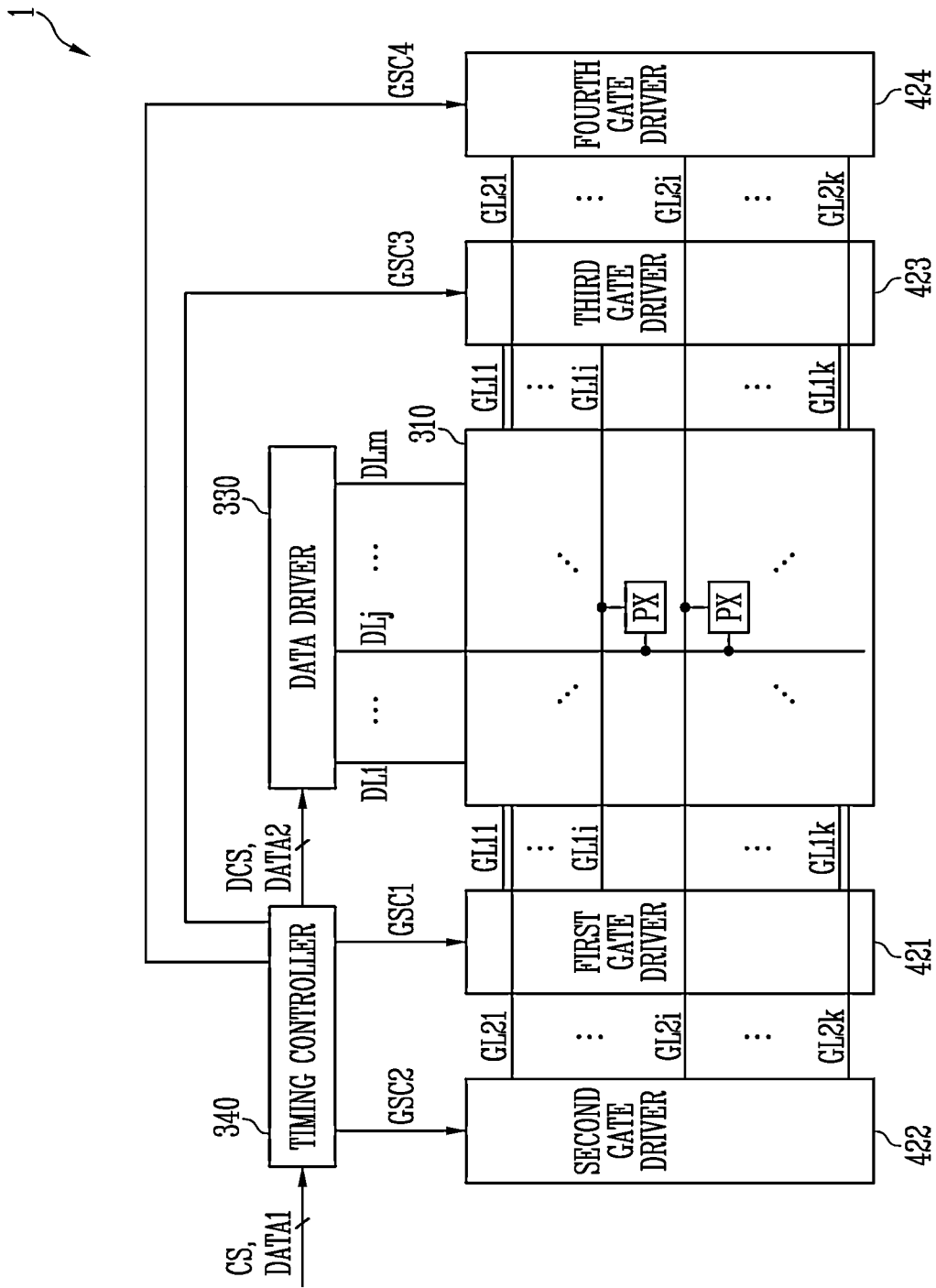

FIGS. 4 and 5 are diagrams illustrating an embodiment of the display device of FIG. 3.

Referring to FIGS. 3 to 5, except for the gate driver 320 of FIG. 3, the display device 1 of FIGS. 4 and 5 may be substantially identical or similar to the display device 1 of FIG. 3. Therefore, for convenience of explanation, a further description of components and technical aspects previously described may be omitted.

The gate lines GL1 to GLn of FIG. 3 may include first gate lines GL11 to GL1k (where k is a positive integer less than or equal to n) and second gate lines GL21 to GL2k. The first gate lines GL11 to GL1k and the second gate lines GL21 to GL2k may be alternately arranged along a scan direction (or along an extension direction of the data lines DL1 to DLm). For example, the first gate lines GL11 to GL1k may be odd-numbered gate lines connected to the pixel PX arranged in an odd-numbered pixel row, and the second gate lines GL21 to GL2k may be even-numbered gate lines connected to the pixel PX arranged in an even-numbered pixel row. In this case, k may be n/2.

The gate driver 320 of FIG. 3 may include a first gate driver 421 and a second gate driver 422.

The first gate driver 421 may generate a first gate signal (for example, a gate signal of a turn-on level) based on a first gate control signal GCS1 (or a first scan control signal), and sequentially provide the first gate signal to the first gate lines GL11 to GL1k. For example, the first gate driver 421 may provide the first gate signal to the pixel PX through a 1i-th gate line GL1i. The first gate control signal GCS1 may include a first start signal, a first clock signal, and the like, and may be provided from the timing controller 340. The first gate driver 421 may include a shift register (or a stage) that sequentially outputs the first gate signal of a pulse shape corresponding to the first start signal using the first clock signal.

Similarly, the second gate driver 422 may generate a second gate signal (for example, a gate signal of a turn-on level) based on a second gate control signal GCS2 (or a second scan control signal), and sequentially provide the second gate signal to the second gate lines GL21 to GL2k. For example, the second gate driver 422 may provide the second gate signal to the pixel PX through a 2i-th gate line GL2i. The second gate control signal GCS2 may include a second start signal, a second clock signal, and the like, and may be provided from the timing controller 340. The second gate driver 422 may include a shift register (or a stage) that sequentially outputs the second gate signal of a pulse shape corresponding to the second start signal using the second clock signal.

In an embodiment, the gate driver 320 of FIG. 3 may further include a third gate driver 423 and a fourth gate driver 424.

As shown in FIG. 5, the first gate driver 421 and the second gate driver 422 may be disposed adjacent to one side of the display unit 110, and the third gate driver 423 and the fourth gate driver 424 may be disposed adjacent to another side of the display unit 110. However, the disclosure is not limited thereto.

The third gate driver 423 may generate a third gate signal based on a third gate control signal GCS3 and sequentially provide the third gate signal to the first gate lines GL11 to GL1k. Except for a disposition position, the third gate driver 423 may be substantially identical or similar to the first gate driver 421. The third gate control signal GCS3 and the third gate signal may be substantially identical to the first gate control signal GCS1 and the first gate signal, respectively. When the first gate signal and the third gate signal that are substantially identical to each other are provided to left and right ends of the first gate lines GL11 to GL1k, a signal delay of the first gate signal and the third gate signal may be reduced.

Similarly, the fourth gate driver 424 may generate a fourth gate signal based on a fourth gate control signal GCS4 and sequentially provide the fourth gate signal to the second gate lines GL21 to GL2k. Except for a disposition position, the fourth gate driver 424 may be substantially identical or similar to the second gate driver 422. The fourth gate control signal GCS4 and the fourth gate signal may be substantially identical to the second gate control signal GCS2 and the second gate signal, respectively.

In an embodiment, in the first mode, while the first gate driver 421 (and the third gate driver 423) provides the first gate signal to the first gate lines GL11 to GL1k, the second gate driver 422 (and the fourth gate driver 424) may provide the second gate signal to the second gate lines GL21 to GL2k. For example, the first gate driver 421 and the second gate driver 422 may alternately output the first gate signal and the second gate signal. Accordingly, the display panel 310 may be driven in the progressive scanning mode.

In an embodiment, in the second mode, the first gate driver 421 (and the third gate driver 423) may provide the first gate signal to the first gate lines GL11 to GL1k, and thereafter, the second gate driver 422 (and the fourth gate driver 424) may provide the second gate signal to the second gate lines GL21 to GL2k. For example, after the first gate driver 421 provides the first gate signal to a 1k-th gate line GL1k, the second gate driver 422 may provide the second gate signal to a 2l-th gate line GL2l. Accordingly, the display panel 310 may be driven in the interlaced scanning mode.

Figure 6:
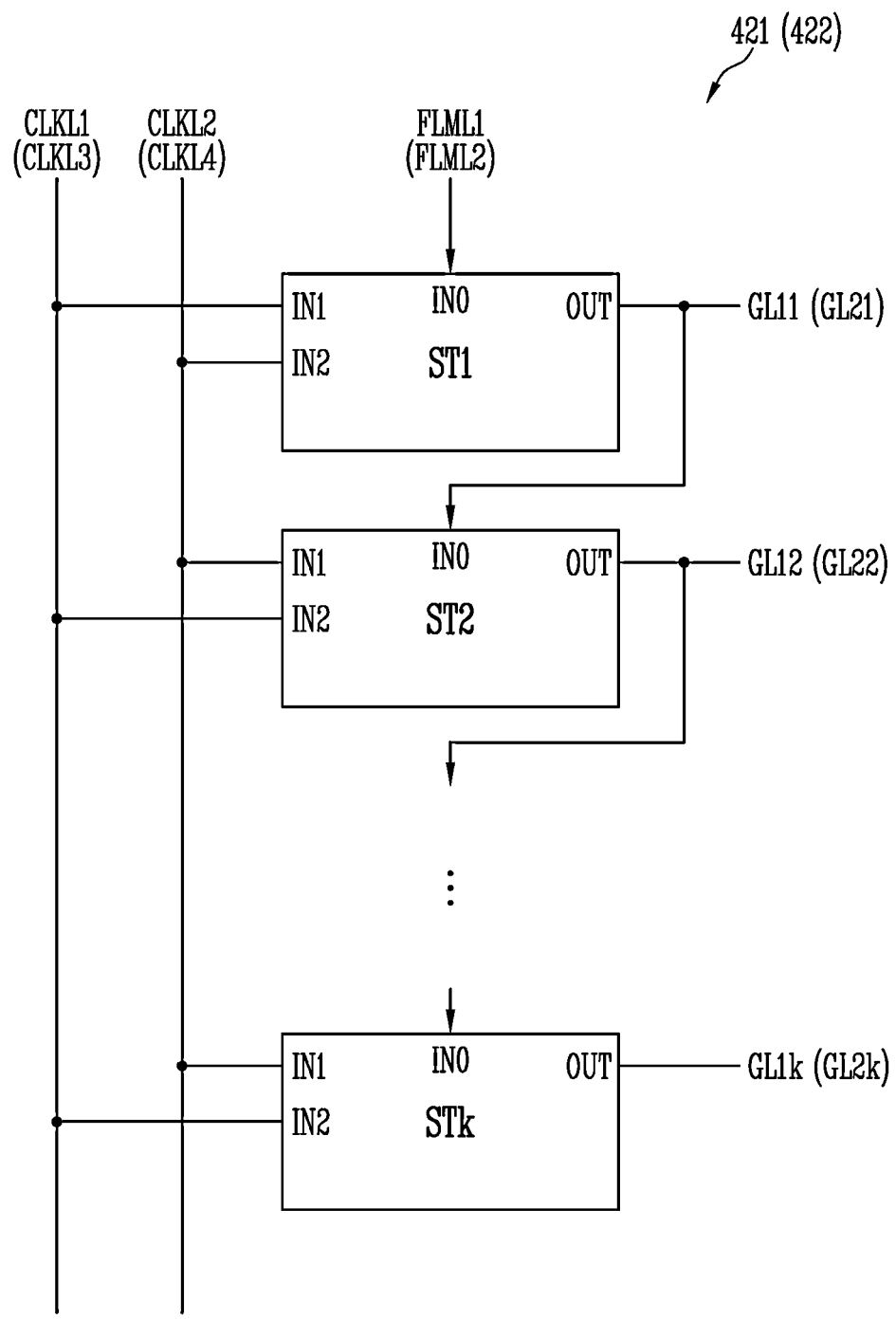
FIG. 6 is a diagram illustrating an embodiment of a gate driver included in the display device of FIG. 4.

FIG. 6 is a diagram illustrating an embodiment of the gate driver included in the display device of FIG. 4. Since the gate drivers 421 to 424 are substantially identical or similar to each other, only the first gate driver 421 is shown in FIG. 6 for convenience of description. A common feature of the gate drivers 421 to 424 of FIGS. 4 and 5 is described based on the first gate driver 421.

Referring to FIGS. 4, 5, and 6, the first gate driver 421 may include stages ST1 to STk. The stages ST1 to STk may provide the first gate signals to the first gate lines GL11 to GL1k, respectively.

Each of the stages ST1 to STk may include an input terminal IN0, a first clock input terminal IN1, a second clock input terminal IN2, and an output terminal OUT. Each of the stages ST1 to STk may include at least one transistor and a capacitor, and internal circuit configurations of the stages ST1 to STk may be substantially the same.

Each of the stages ST1 to STk of the first gate driver 421 may be connected to a first clock signal line CLKL1 and a second clock signal line CLKL2. Clock signals may be applied from the timing controller 340 (refer to FIG. 4) to the first clock signal line CLKL1 and the second clock signal line CLKL2. As described further below with reference to FIG. 8, the second clock signal applied to the second clock signal line CLKL2 may have a phase delayed more than the first clock signal applied to the first clock signal line CLKL1, for example, the second clock signal may have a phase delayed by 180 degrees (or an inverted phase) more than the first clock signal. In an embodiment, the first start signal may be applied to a first start signal line FLML1 from the timing controller 340 (refer to FIG. 4).

For example, in a first stage ST1 (or an odd-numbered stage) of the first gate driver 421, the first clock input terminal IN1 may be connected to the first clock signal line CLKL1 and the second clock input terminal IN2 may be connected to the second clock signal line CLKL2. In a second stage ST2 (a k-th stage STk, or an even-numbered stage) of the first gate driver 421, the first clock input terminal IN1 may be connected to the second clock signal line CLKL2 and the second clock input terminal IN2 may be connected to the first clock signal line CLKL1.

Each of the stages ST1 to STk of the first gate driver 421 may be connected to the first start signal line FLML1 or the output terminal OUT of a previous stage, and may generate the first gate signal corresponding to the first start signal provided through the first start signal line FLML1 and a previous gate signal of the previous stage.

For example, the input terminal IN0 of the first stage ST1 of the first gate driver 421 may be connected to the first start signal line FLML1. The first stage ST1 of the first gate driver 421 may generate the first gate signal corresponding to the start signal applied to the first start signal line FLML1 (for example, delayed from the first start signal by a half period of the first clock signal). For example, the input terminal IN0 of the second stage ST2 may be connected to the output terminal OUT (or the first gate line GL1) of the first stage ST1. Similarly, the input terminal IN0 of the n-th stage STn may be connected to the output terminal (or an (n−1)-th gate line) of the (n−1)-th stage.

That is, the stages ST1 to STk of the first gate driver 421 may sequentially generate the first gate signals corresponding to the first start signal.

Similarly, the second gate driver 422 may include stages ST1 to STk. The stages ST1 to STk may provide the second gate signals to the second gate lines GL21 to GL2k, respectively.

Each of the stages ST1 to STk of the second gate driver 422 may be connected to a third clock signal line CLKL3 and a fourth clock signal line CLKL4. As described further below with reference to FIG. 8, a fourth clock signal applied to the fourth clock signal line CLKL4 has a phase delayed more than a third clock signal applied to the third clock signal line CLKL3, for example, the fourth clock signal may have a phase delayed by 180 degrees (or an inverted phase) more than the third clock signal. A second start signal (or a second start pulse) may be applied to a second start signal line FLML2 from the timing controller 340 (refer to FIG. 4).

A connection configuration between the stages ST1 to STk of the second gate driver 422 and the third and fourth clock signal lines CLK3 and CLK4 may be substantially identical or similar to a connection configuration between the stages ST1 to STk of the first gate driver 421 and the first and second clock signal lines CLK1 and CLK2.

Each of the stages ST1 to STk of the second gate driver 422 may be connected to the second start signal line FLML2 or the output terminal OUT of a previous stage, and may generate the second gate signal corresponding to the start signal provided through the second start signal line FLML2 and a previous gate signal of the previous stage.

For example, the input terminal IN0 of the first stage ST1 of the second gate driver 422 may be connected to the second start signal line FLML2. The first stage ST1 of the second gate driver 422 may generate the second gate signal corresponding to the start signal applied to the second start signal line FLML2.

That is, the stages ST1 to STk of the second gate driver 422 may sequentially generate the second gate signals corresponding to the second start signal.

Figure 7:
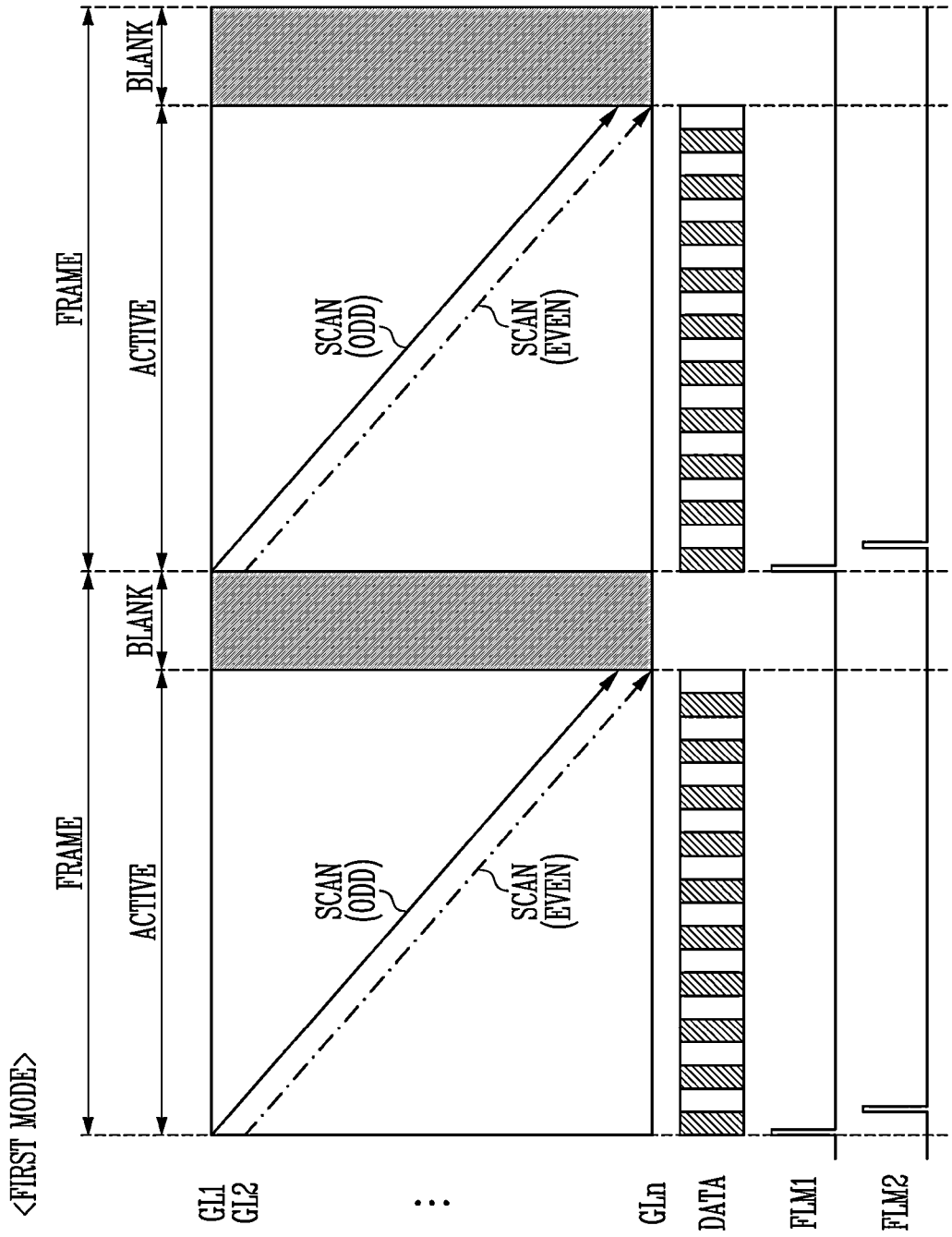
FIG. 7 is a diagram illustrating an operation in a first mode of the display device of FIG. 4 according to an embodiment of the disclosure.

FIG. 7 is a diagram illustrating an operation in the first mode of the display device of FIG. 4 according to an embodiment of the disclosure.

Referring to FIGS. 1 to 7, the first start signal FLM1 may be provided to the first start signal line FLML1 (refer to FIG. 6), the second start signal FLM2 may be provided to the second start signal line FLML2 (refer to FIG. 6), and a data signal DATA (or a data voltage) may be provided to the data lines DL1 to DLm.

In the first mode, a frame FRAME (or a frame period) may include an active period ACTIVE and a blank period BLANK (or a porch period). The frame FRAME may be a period for displaying one frame image. In the active period ACTIVE, the data signal DATA may have a valid value and may be provided or written to the pixel PX (refer to FIG. 4). The blank period BLANK is a period allocated between the active period ACTIVE and an active period ACTIVE of a subsequent frame, and in the blank period BLANK, the data signal DATA is not provided or does not have a valid value.

In the first mode, the first start signal FLM1 and the second start signal FLM2 may have a turn-on pulse at substantially the same time, for example, with a difference of about 1 horizontal time. Accordingly, in the active period ACTIVE, the first gate driver 421 may sequentially provide the first gate signal to the first gate lines GL11 to GL1k (refer to FIG. 4), and the second gate driver 422 may sequentially provide the second gate signal to the second gate lines GL21 to GL2k (refer to FIG. 4) simultaneously with the sequential provision of the first gate signal. That is, gate signals may be sequentially provided to the gate lines GL1 to GLn.

In the blank period BLANK, the sensor unit 120 (refer to FIG. 1) (and the sensor driver 220 (refer to FIG. 1)) may drive and sense the touch input. For example, in the blank period BLANK, the sensor driver 220 may receive or sample the sensing signal output through the sensor unit 120. As described above, when the sensor unit 120 (and the sensor driver 220) drives to sense the touch input in the active period ACTIVE, interference may occur in the display unit 110 (refer to FIG. 1), and display quality may be degraded due to the interference. Therefore, a sensing operation for the touch input may not be performed in the active period ACTIVE, and the sensing operation for the touch input may be performed in the blank period BLANK.

Figure 8:
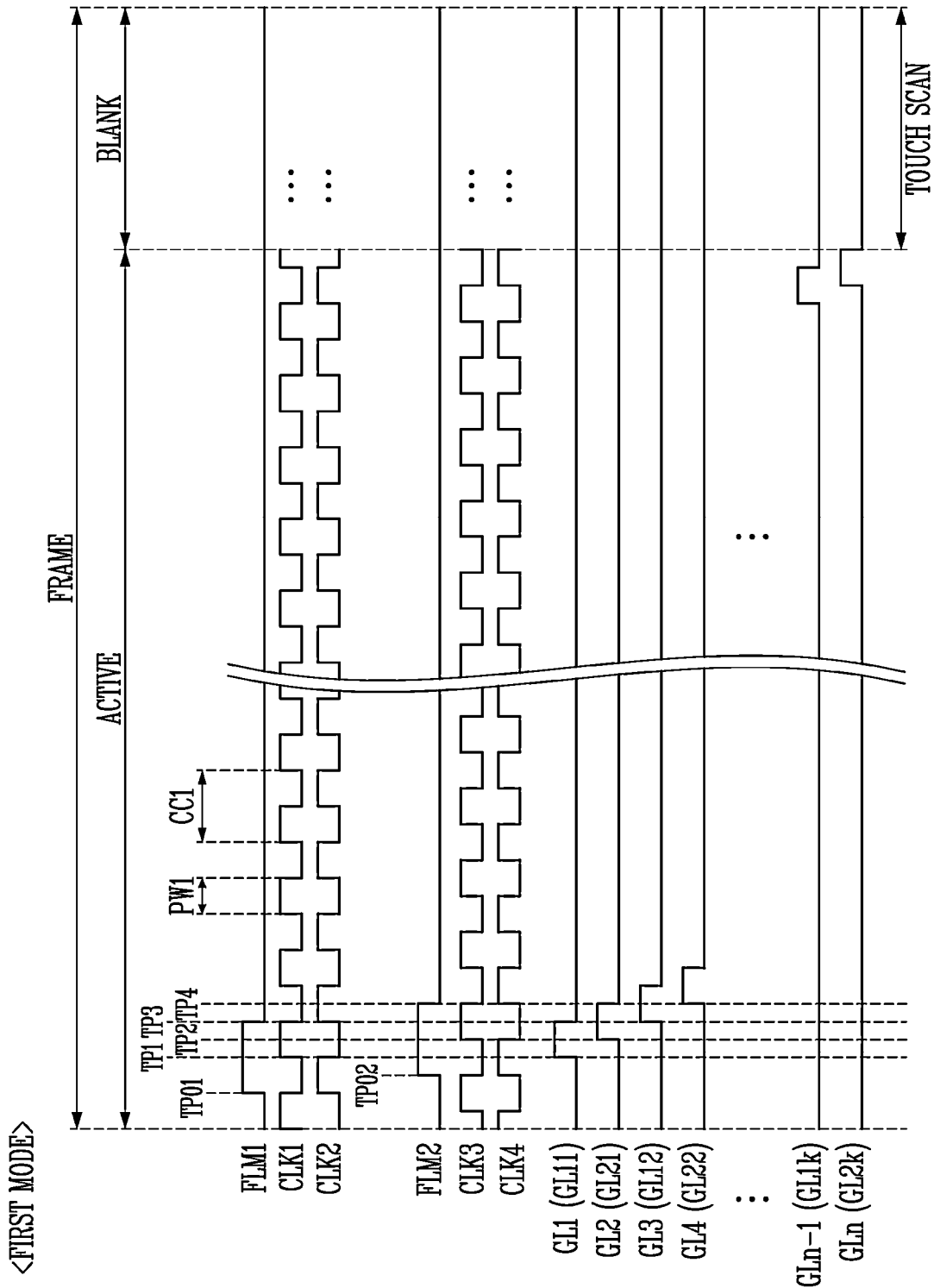
FIGS. 8 and 9 are diagrams illustrating an operation in the first mode of first and second gate drivers of FIG. 4 according to embodiments of the disclosure.
Figure 9:
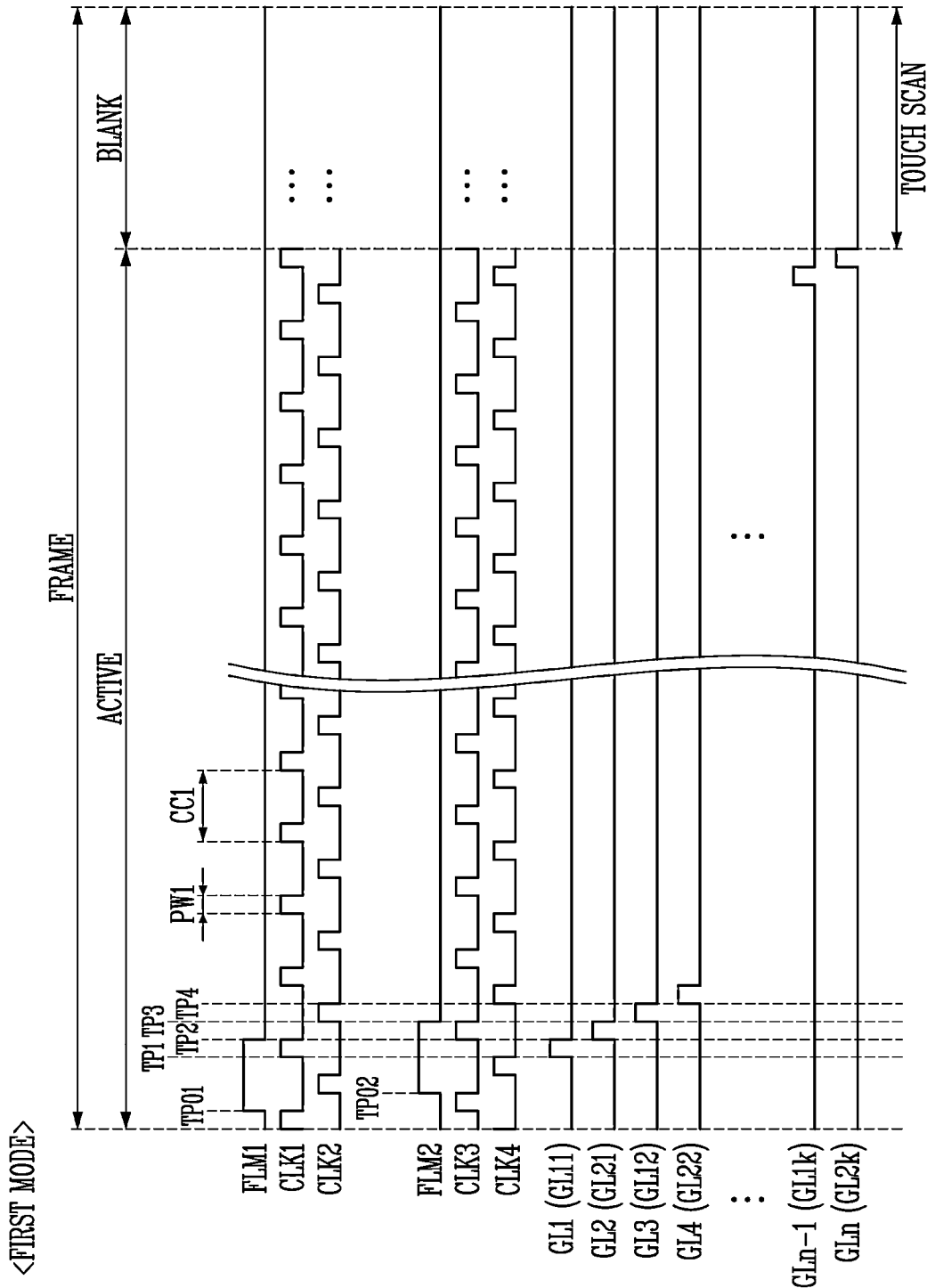

FIGS. 8 and 9 are diagrams illustrating an operation in the first mode of the first and second gate drivers of FIG. 4 according to embodiments of the disclosure. FIGS. 8 and 9 show the clock signals CLK1 to CLK4 according to embodiments of the disclosure.

Referring to FIGS. 1 to 9, the first clock signal CLK1 may be provided to the first clock signal line CLKL1 (refer to FIG. 6), the second clock signal CLK2 may be provided to the second clock signal line CLKL2 (refer to FIG. 6), the third clock signal CLK3 may be provided to the third clock signal line CLKL3 (refer to FIG. 6), and the fourth clock signal CLK4 may be provided to the fourth clock signal line CLKL4 (refer to FIG. 6). As shown in FIGS. 8 and 9, the clock signals CLK1 to CLK4 may have phases different from each other. The second clock signal CLK2 may have a waveform in which the first clock signal CLK1 is delayed by about ½ of a first period CC1 (or delayed by about 180 degrees), and the fourth clock signal CLK4 may have a waveform in which the third clock signal CLK3 is delayed by about ½ of the first period CC1. The third clock signal CLK3 may have a waveform delayed by about ¼ of the first period CC1 of the first clock signal CLK1 (or delayed by about 90 degrees). As shown in FIG. 8, a width (that is, a first pulse width PW1) of turn-on pulses of the clock signals CLK1 to CLK4 may be about ½ (or about 2 horizontal times) of the first period CC1 of the clock signals CLK1 to CLK4. In this case, the gate signals of the gate lines GL1 to GLn may partially overlap. However, the disclosure is not limited thereto. For example, as shown in FIG. 9, the width (that is, the first pulse width PW1) of the turn-on pulses of the clock signals CLK1 to CLK4 may be less than about ½ of the period CC1, or less than or equal to about ¼ (or about 1 horizontal time) of the first period CC1 of the clock signals CLK1 to CLK4 according to an embodiment. In this case, in an embodiment, the gate signals of the gate lines GL1 to GLn do not overlap each other.

At a first reference time point TP01, the first start signal FLM1 may transition from a turn-off level to a turn-on level. In FIG. 8, the turn-on level is shown as a high level and the turn-off level is shown as a low level, but this is an example based on an n-type transistor, and is not limited thereto. For example, based on a p-type transistor, the turn-on level may be a low level and the turn-off level may be a high level.

In this case, according to the operation of the first gate driver 421 (refer to FIG. 6) based on the first start signal FLM1 and the first and second clock signals CLK1 and CLK2, in the active period ACTIVE, a gate signal (or pulse) of the turn-on level may be sequentially provided to the first gate lines GL11 to GL1k (or odd-numbered gate lines, that is, the first gate line GL1, the third gate line GL3, . . . , and the (n−1)-th gate line GLn−1). For example, at a first time point TP1, the gate signal may be applied to the first gate line GL1 (or an eleventh gate line GL11), and at a third time point TP3, the gate signal may be applied to the third gate line GL3 (or a twelfth gate line GL12).

At a second reference time point TP02, the second start signal FLM2 may transition from the turn-off level to the turn-on level. The second reference time point TP02 may be a time point within about ½ of the first period CC1 of the clock signals CLK1 to CLK4 from the first reference time point TP01 (for example, a time point after about 1 horizontal time). The second reference time point TP02 may be included in the same period (for example, the active period ACTIVE) as the first reference time point TP01.

In this case, according to the operation of the second gate driver 422 (refer to FIG. 6) based on the second start signal FLM2 and the third and fourth clock signals CLK3 and CLK4, a gate signal (or pulse) of the turn-on level may be sequentially provided to the second gate lines GL21 to GL2k (or even-numbered gate lines, that is, the second gate line GL2, the fourth gate line GL4, . . . , and the n-th gate line GLn). For example, at a second time point TP2, the gate signal may be applied to the second gate line GL2 (or a twenty-first gate line GL21), and at a fourth time point TP4, the gate signal may be applied to the fourth gate line GL4 (or a twenty-second gate line GL22).

A touch scan operation may be performed in the blank period BLANK. As described with reference to FIG. 7, in the blank period BLANK, the sensor unit 120 (refer to FIG. 1) (and the sensor driver 220 (refer to FIG. 1)) may drive and sense the touch input.

Figure 10:
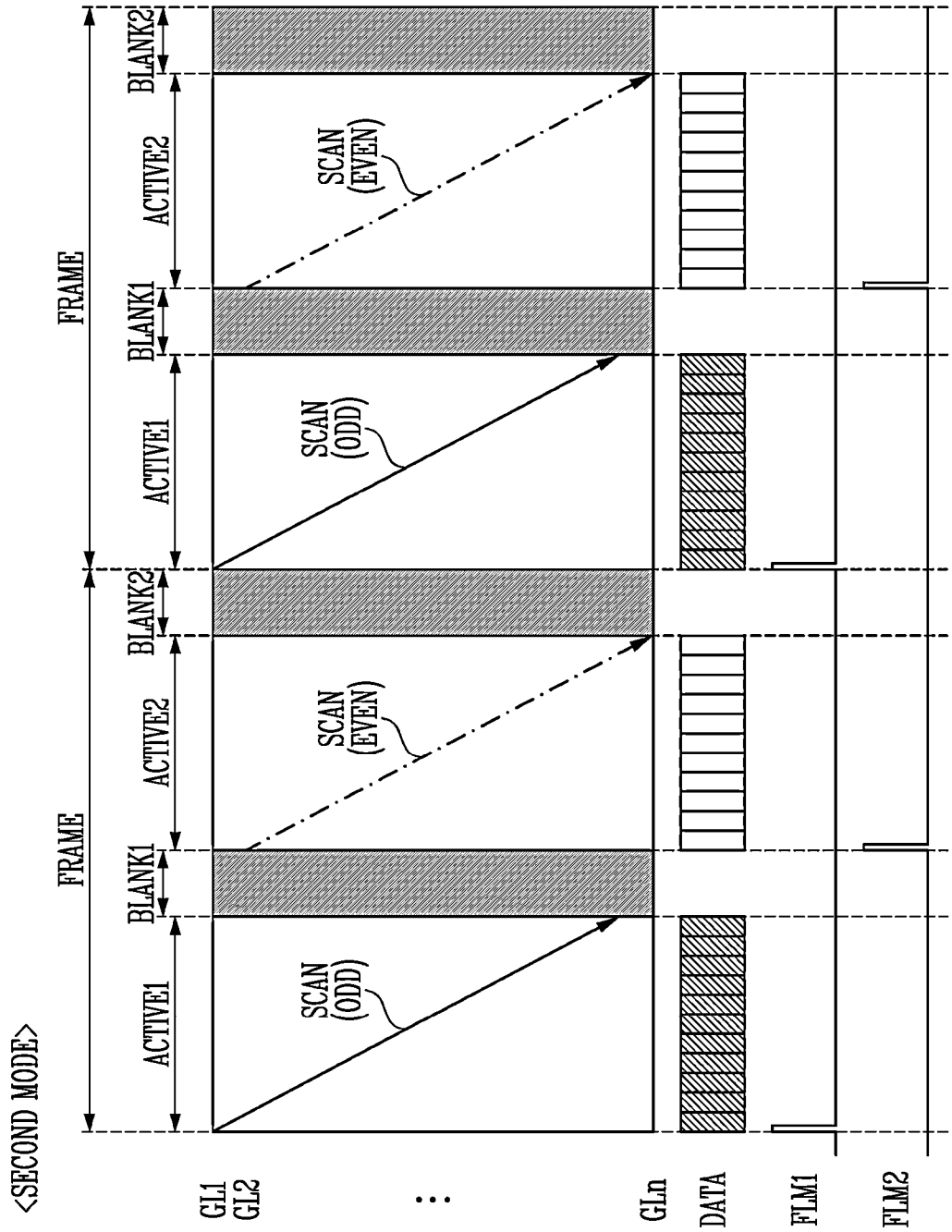
FIG. 10 is a diagram illustrating an operation in a second mode of the display device of FIG. 4 according to an embodiment of the disclosure.

FIG. 10 is a diagram illustrating an operation in the second mode of the display device of FIG. 4 according to an embodiment of the disclosure.

Referring to FIGS. 1 to 10, in the second mode, the frame FRAME may include a first active period ACTIVE1 (or a first period), a first blank period BLANK1 (or a second period), a second active period ACTIVE2 (or a third period), and a second blank period BLANK2 (or a fourth period) sequentially arranged. In an embodiment, the first active period ACTIVE1, the first blank period BLANK1, the second active period ACTIVE2, and the second blank period BLANK2 do not overlap each other. A size (or a time) of the frame FRAME in the second mode may be substantially the same as a size of the frame FRAME in the first mode. For example, in the first mode, the frame FRAME may be about 1/120 second, and similarly, in the second mode, the frame FRAME may also be about 1/120 second. That is, a refresh rate of the image in the second mode may be the same as a refresh rate of the image in the first mode. However, the disclosure is not limited thereto, and for example, the size of the frame FRAME in the second mode may be less than the size of the frame FRAME in the first mode according to embodiments.

Each of the first active period ACTIVE1 and the second active period ACTIVE2 may be similar to the active period ACTIVE of FIG. 7, and a total time of the first active period ACTIVE1 and the second active period ACTIVE2 may be substantially the same as a time of the active period ACTIVE of FIG. 7. The first blank period BLANK1 and the second blank period BLANK2 may be similar to the blank period BLANK of FIG. 7, and a total time of the first blank period BLANK1 and the second blank period BLANK2 may be substantially the same as a time of the blank period BLANK of FIG. 7.

A first interlaced scanning operation (for example, a scanning operation for the odd-numbered gate lines) may be performed in the first active period ACTIVE1, and a second interlaced scanning operation (for example, a scanning operation for the even-numbered gate lines) may be performed in the second active period ACTIVE2.

To this end, in the second mode, the first start signal FLM1 and the second start signal FLM2 may have a turn-on pulse in different periods. For example, the first start signal FLM1 may have the turn-on pulse at a start time point of the first active period ACTIVE1 or at and end time point of the second blank period BLANK2, and the second start signal FLM2 may have the turn-on pulse at a start time point of the second active period ACTIVE2 or an end time point of the first blank period BLANK1.

Accordingly, in the first active period ACTIVE1, the first gate driver 421 may sequentially provide the first gate signal to the first gate lines GL11 to GL1k (refer to FIG. 4), and in the second active period ACTIVE2, the second gate driver 422 may sequentially provide the second gate signal to the second gate lines GL21 to GL2k (refer to FIG. 4).

The sensing operation for the touch input may be performed in each of the first blank period BLANK1 and the second blank period BLANK2. For example, in each of the first blank period BLANK1 and the second blank period BLANK2, the sensor unit 120 (refer to FIG. 1) (and the sensor driver 220 (refer to FIG. 1)) may drive and sense the touch input. That is, a driving period in the second mode of the sensor unit 120 (refer to FIG. 1) (and the sensor driver 220 (refer to FIG. 1)) may be different from a driving period in the first mode. For example, the driving period in the second mode may be shorter than the driving period in the first mode, and the number of times the touch input is sensed (or a report rate) in the second mode may be greater than the number of times the touch input is sensed in the first mode.

Therefore, the display device 1 (refer to FIG. 1) may maintain the refresh rate of the image, avoid interference with the display unit 110 (refer to FIG. 1) (and degradation of display quality due to the interference), and perform the sensing operation for the touch input at a higher driving frequency. In addition, different from the progressive scanning used in the first mode, since interlaced scanning is used in the second mode, degradation of display quality (refer to FIG. 13) that occurs when progressive scanning is applied to the second mode may be prevented or reduced.

Figure 11:
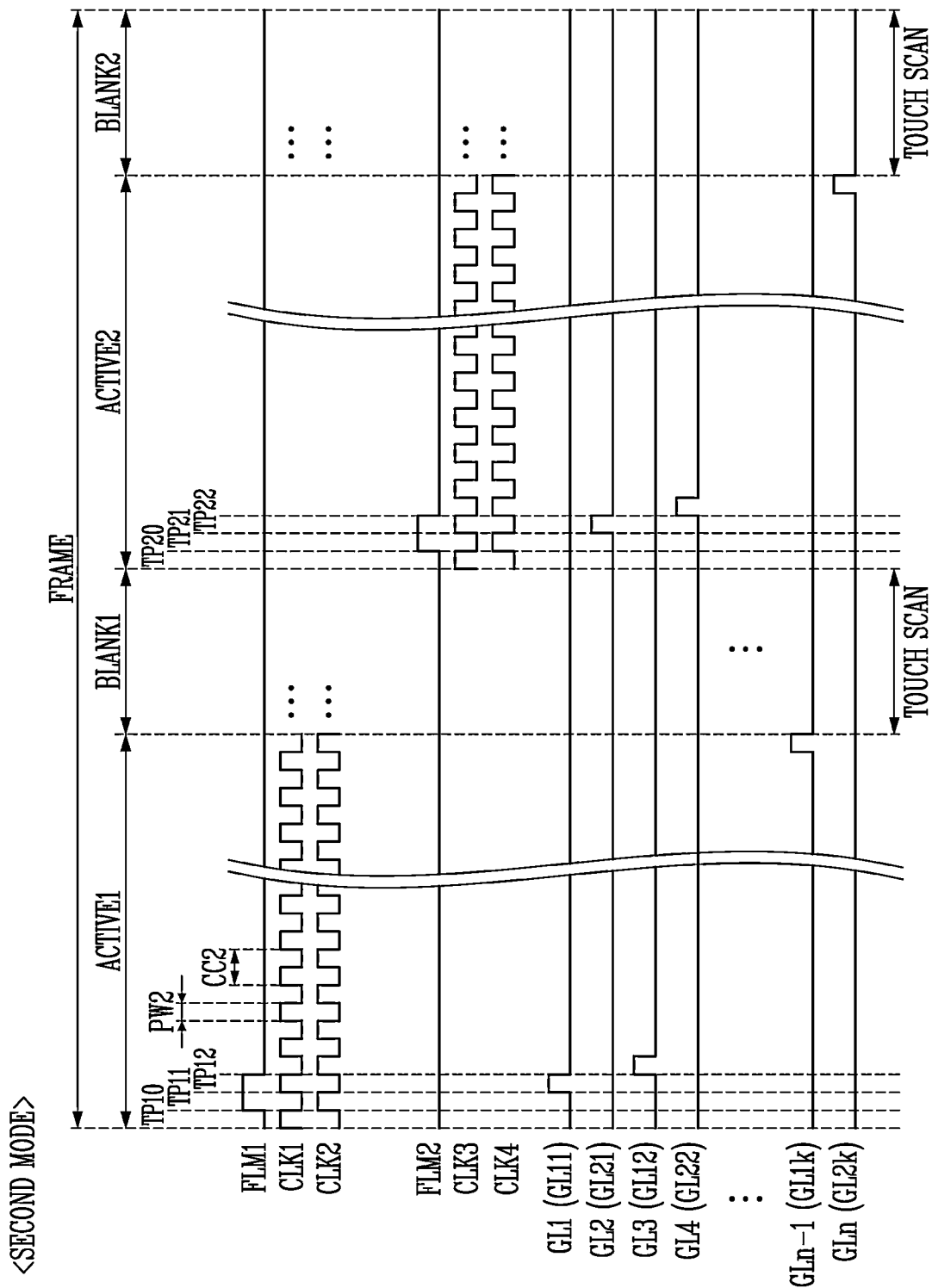
FIG. 11 is a diagram illustrating the operation in the second mode of the first and second gate drivers of FIG. 4 according to an embodiment of the disclosure.

FIG. 11 is a diagram illustrating the operation in the second mode of the first and second gate drivers of FIG. 4 according to an embodiment of the disclosure.

Referring to FIGS. 1 to 11, in the first active period ACTIVE1, the first clock signal CLK1 and the second clock signal CLK2 may have a pulse, and in remaining periods (for example, the first blank period BLANK1, the second active period ACTIVE2, and the second blank period BLANK2), the first clock signal CLK1 and the second clock signal CLK2 may or may not have a pulse. For example, to reduce power consumption in the first blank period BLANK1, the second active period ACTIVE2, and the second blank period BLANK2, the first clock signal CLK1 and the second clock signal CLK2 may be maintained as the turn-off level or the turn-on level.

Similarly, in the second active period ACTIVE2, the third clock signal CLK3 and the fourth clock signal CLK4 may have a pulse, and in the remaining periods (for example, the first active period ACTIVE1, the first blank period BLANK1, and the second blank period BLANK2), the third clock signal CLK3 and the fourth clock signal CLK4 may or may not have a pulse. For example, to reduce power consumption in the first active period ACTIVE1, the first blank period BLANK1, and the second blank period BLANK2, the third clock signal CLK3 and the fourth clock signal CLK4 may be maintained as the turn-off level or the turn-on level.

In the second mode, a second period CC2 (or a second frequency) of the clock signals CLK1 to CLK4 may be different from the first period CC1 (or the first frequency) of the clock signals CLK1 to CLK4 in the first mode. For example, the second period CC2 of the clock signals CLK1 to CLK4 in the second mode may be about ½ of the first period CC1 of the clock signals CLK1 to CLK4 in the first mode, or the second frequency of the clock signals CLK1 to CLK4 in the second mode may be about twice the first frequency of the clock signals CLK1 to CLK4 in the first mode. However, the disclosure is not limited thereto. In addition, a width (that is, a second pulse width PW2) of the turn-on pulse of the clock signals CLK1 to CLK4 may be less than or about equal to the first pulse width PW1 of the clock signals CLK1 to CLK4 in the first mode. For example, the second pulse width PW2 may be less than the first pulse width PW1 of FIG. 8 or about equal to the first pulse width PW1 of FIG. 9.

At a tenth time point TP10 (or the first reference time point), the first start signal FLM1 may transition from the turn-off level to the turn-on level. The tenth time point TP10 may be included in the first active period ACTIVE1, but is not limited thereto.

In this case, according to the operation of the first gate driver 421 (refer to FIG. 6) based on the first start signal FLM1 and the first and second clock signals CLK1 and CLK2, in the active period ACTIVE, the gate signal (or pulse) of the turn-on level may be sequentially provided to the first gate lines GL11 to GL1$k$ (or the odd-numbered gate lines, that is, the first gate line GL1, the third gate line GL3, ..., and the (n-1)-th gate line GLn-1). For example, at an eleventh time point TP11, the gate signal may be applied to the first gate line GL1 (or the eleventh gate line GL11), and at a twelfth time point TP12, the gate signal may be applied to the third gate line GL3 (or the twelfth gate line GL12).

Thereafter, at a twentieth time point TP20 (or the second reference time point), the second start signal FLM2 may transition from the turn-off level to the turn-on level. The twentieth time point TP20 may be included in a period different from that of the tenth time point TP10, and for example, the twentieth time point TP20 may be included in the second active period ACTIVE2.

In this case, according to the operation of the second gate driver 422 (refer to FIG. 6) based on the second start signal FLM2 and the third and fourth clock signals CLK3 and CLK4, the gate signal (or pulse) of the turn-on level may be sequentially provided to the second gate lines GL21 to GL2$k$ (or the even-numbered gate lines, that is, the second gate line GL2, the fourth gate line GL4, ..., and the n-th gate line GLn). For example, at a twenty-first time point TP21, the gate signal may be applied to the second gate line GL2 (or the twenty-first gate line GL21), and at a twenty-second time point TP22, the gate signal may be applied to the fourth gate line GL4 (or the twenty-second gate line GL22).

The touch scan operation may be performed in the blank period BLANK. As described with reference to FIG. 10, in the first blank period BLANK1 and the second blank period BLANK2, the sensor unit 120 (refer to FIG. 1) (and the sensor driver 220 (refer to FIG. 1)) may drive and sense the touch input.

Figure 12:
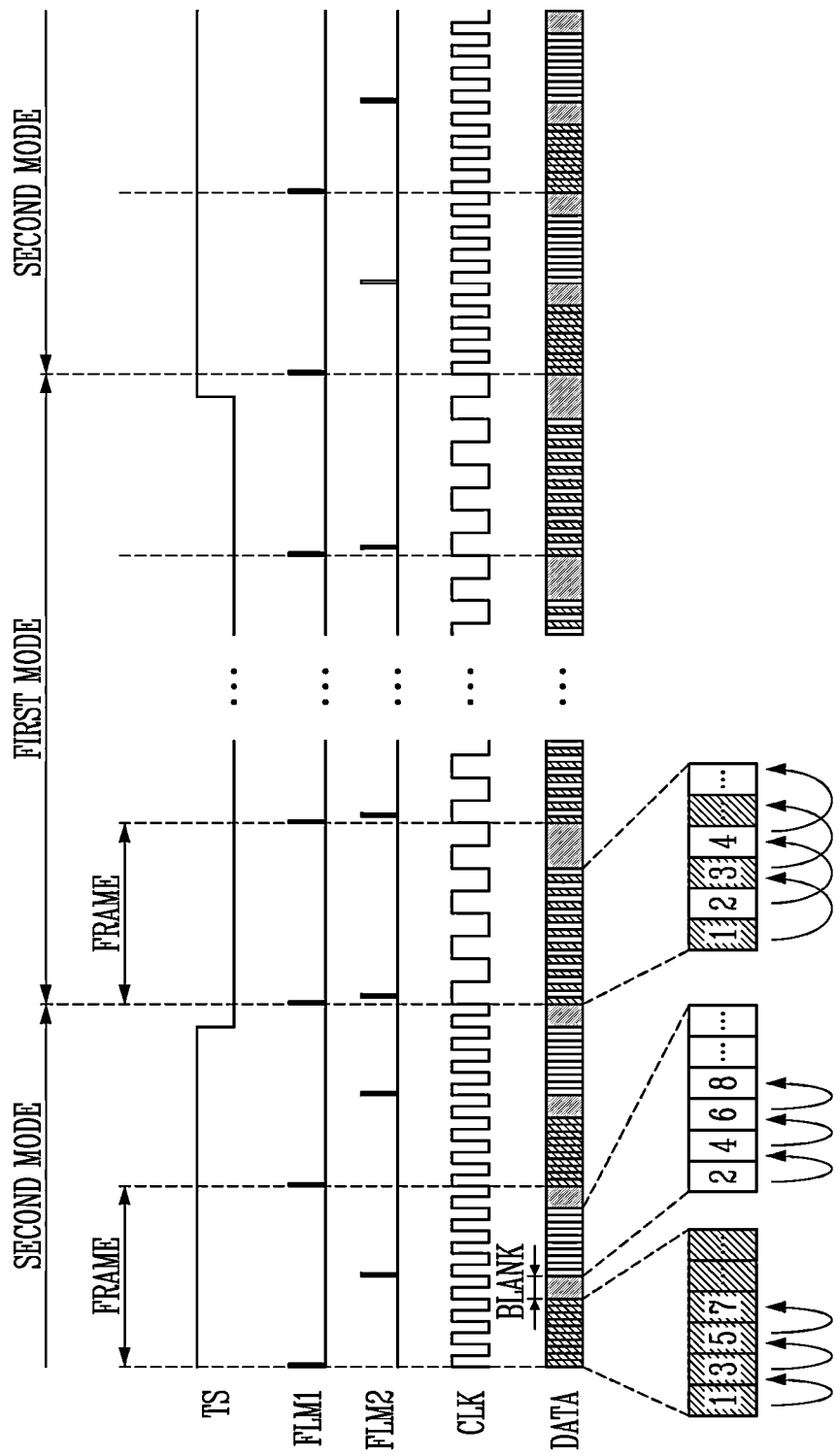
FIG. 12 is a diagram illustrating an operation of the display device of FIG. 1 according to an embodiment of the disclosure.

FIG. 12 is a diagram illustrating an operation of the display device of FIG. 1 according to an embodiment of the disclosure. In FIG. 12, some signals are shown based on mode switching between the first mode and the second mode of the display device 1 of FIG. 1.

Referring to FIGS. 1 to 12, a touch signal TS may indicate whether the display device 1 (refer to FIG. 1) (or the application processor 30 (refer to FIG. 1)) and the external input device (for example, a stylus pen, for example, an active electrostatic (AES) pen) are interlocked or whether the touch input is sensed. For example, a high level of touch signal TS may represent or indicate a case where the display device 1 is interlocked with the external input device or activated, and a low level of touch signal TS may represent a case where the display device 1 is not interlocked with the external input device or deactivated. As another example, the high level of touch signal TS may represent or indicate a case where the touch input is sensed through the sensor unit 120 (refer to FIG. 1), and the low level of touch signal TS may represent or indicate a case where the touch input is not sensed through the sensor unit 120.

When the touch signal TS has or maintains the low level, the display device 1 (refer to FIG. 1) may perform mode switching from the second mode to the first mode or may maintain the first mode. When the touch signal TS changes from the high level to the low level, the display device 1 may perform the mode switching from the second mode to the first mode in a subsequent frame FRAME.

As described with reference to FIGS. 7 to 9, in the first mode, the display device 1 may operate in the progressive scanning mode. To this end, the first start signal FLM1 and the second start signal FLM2 may have the turn-on pulse at substantially the same time, for example, with a difference of about 1 horizontal time. In response to the progressive scanning, during the frame FRAME, the data signal DATA may sequentially have voltages corresponding to an order of pixel rows (for example, a first voltage corresponding to a first pixel row, a second voltage corresponding to a second pixel row, a third voltage corresponding to a third pixel row, and a fourth voltage corresponding to a fourth pixel row).

In the first mode, the frame FRAME may include one blank period BLANK, and the touch scan operation may be performed in the blank period BLANK.

When the touch signal TS has or maintains the high level, the display device 1 may perform the mode switching from the first mode to the second mode or may maintain the second mode. When the touch signal TS changes from the low level to the high level, the display device 1 may perform the mode switching from the first mode to the second mode in a subsequent frame FRAME.

As described with reference to FIGS. 10 and 11, in the second mode, the display device 1 may operate in the interlaced scanning mode. To this end, at a time point when about ½ of the frame FRAME elapses from a time point when the first start signal FLM1 has the turn-on pulse, the second start signal FLM2 may have the turn-on pulse. In response to the interlaced scanning, the data signal DATA may sequentially have voltages corresponding to odd-numbered pixel rows (for example, voltages corresponding to first, third, fifth, and seventh pixel rows) during the first half of the frame FRAME, and may sequentially have voltages corresponding to even-numbered pixel rows (for example, second, fourth, sixth, and eighth pixel rows) during the second half of the frame FRAME. For interlaced scanning, a period of the clock signal CLK (that is, the clock signals CLK1 to CLK4 (refer to FIGS. 8, 9, and 11) in the second mode may be shorter than the period of the clock signal CLK in the first mode.

In the second mode, the frame FRAME may include two blank periods BLANK, and the touch scan operation may be performed in the blank periods BLANK.

As described above, the display device 1 may perform the mode switching between the first mode and the second mode based on whether interlocked with the external input device or whether the touch input occurs, and may vary the number of blank periods BLANK (that is, periods in which the touch scan operation may be performed) in one frame FRAME. Therefore, the display device 1 may sense the touch input at a higher driving frequency and display the touch input result more quickly and naturally. In addition, the display device 1 may operate in the progressive scanning mode in the first mode and operate in the interlaced scanning mode in the second mode by changing a position of the second start signal FLM2 and the period of the clock signal CLK according to the first mode and the second mode. Therefore, degradation of display quality may be prevented or reduced.

Figure 13:
FIG. 13 is a diagram illustrating an image displayed on a display device according to a comparative example and an image displayed on the display device of FIG. 1 according to an embodiment of the disclosure.
Figure 13:

FIG. 13 is a diagram illustrating an image displayed on a display device according to a comparative example and an image displayed on the display device of FIG. 1 according to an embodiment of the disclosure.

Referring to FIGS. 1 to 13, a first image IMAGE1 represents an image displayed on a display device according to a comparative example, and a second image IMAGE2 represents an image displayed on the display device 1 of FIG. 1 according to an embodiment of the disclosure.

It is assumed that the display device according to the comparative example operates only in the second mode described with reference to FIG. 10. As described above with reference to FIG. 10, the first blank period BLANK1 may be inserted between the first active period ACTIVE1 and the second active period ACTIVE2. When the display device displays an image (for example, a moving image) having many changes between the frames FRAME, due to latency corresponding to the interlaced scanning (and the first blank period BLANK1), in the first image IMAGE1 of the first mode, horizontal lines may be recognized along a horizontal direction.

Since the display device 1 according to embodiments of the disclosure operates using progressive scanning rather than interlaced scanning in the first mode, a horizontal line may be prevented from being visually recognized (or the visual recognition of the horizontal line may be reduced), as shown in the second image IMAGE2. In addition, when the touch input (particularly, writing using a stylus pen) occurs, a still image rather than a moving image is generally displayed, and thus, horizontal lines may not be visually recognized also in the second mode (or the visual recognition of horizontal lines may be reduced).

Figure 14:
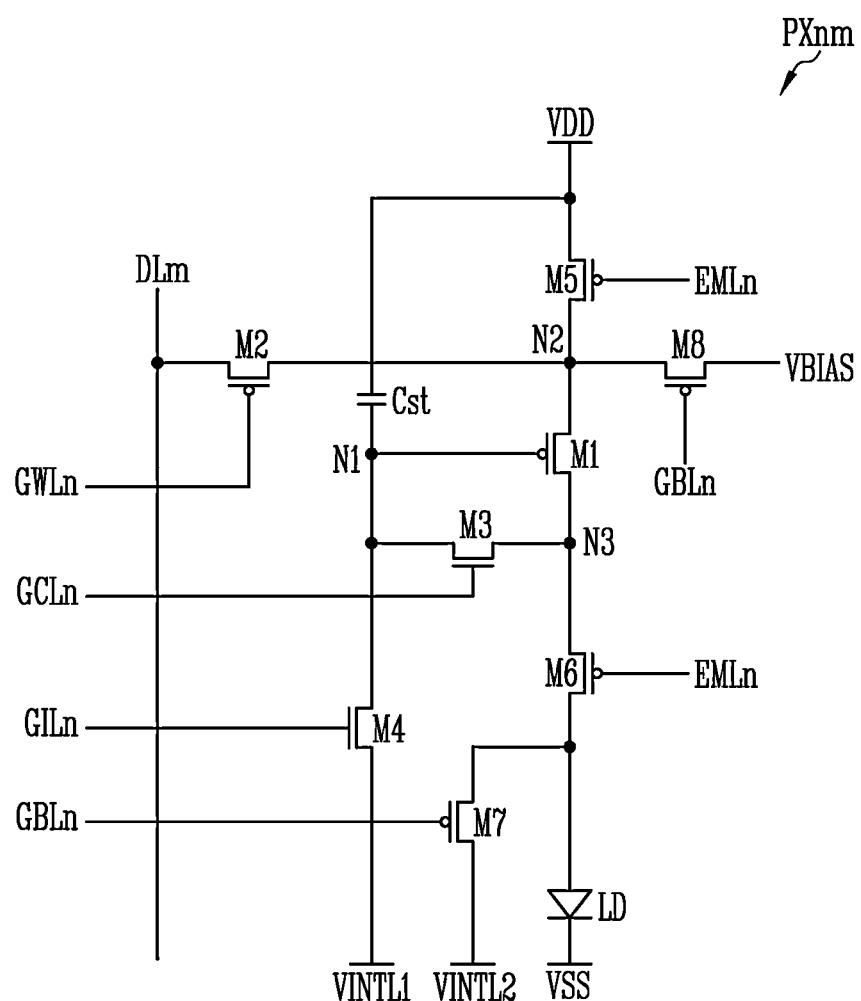
FIG. 14 is a circuit diagram illustrating an embodiment of a pixel included in the display device of FIG. 1.

FIG. 14 is a circuit diagram illustrating an embodiment of the pixel included in the display device of FIG. 1. For convenience of description, FIG. 14 shows a pixel PXnm positioned on an n-th horizontal line (or an n-th pixel row) and connected to an m-th data line Dm, where m and n are positive integers.

Referring to FIGS. 1 and 2, the pixel PXnm may be electrically connected to a write gate line GWLn, an initialization gate line GILn, a compensation gate line GCLn, emission control lines EMLn (or emission gate lines), and a bias control line GBLn (a bias gate line, or a bypass control line). Each of the write gate line GWLn, the initialization gate line GILn, the compensation gate line GCLn, the emission control lines EMLn, and the bias control line GBLn may correspond to the gate line GL of FIG. 1. The write gate line GWLn, the initialization gate line GILn, the compensation gate line GCLn, the emission control lines EMLn, and the bias control line GBLn are distinguished from each other according to the purpose of a signal (or a gate signal), and all of the above-described lines may be substantially identical or similar signal transmission lines.

The pixel PXnm may include transistors M1 to M8, a storage capacitor Cst, and a light emitting element LD.

A first electrode of the first transistor M1 may be connected to a second node N2, a second electrode of the first transistor M1 may be connected to a third node N3, and a gate electrode of the first transistor M1 may be connected to a first node N1. The first transistor M1 may be referred to as a driving transistor. The first transistor M1 may control a current amount flowing from a first power supply line VDD to a second power supply line VSS via the light emitting element LD in response to a voltage of the first node N1.

A first electrode of the second transistor M2 may be connected to the data line DLm, a second electrode of the second transistor M2 may be connected to the first electrode (or the second node N2) of the first transistor M1, and a gate electrode of the second transistor M2 may be connected to the write gate line GWLn. The second transistor M2 may be referred to as a switching transistor. The second transistor M2 may be turned on when a write gate signal is supplied to the write gate line GWLn to electrically connect the data line DLm and the first electrode of the first transistor M1.

A first electrode of the third transistor M3 may be connected to the gate electrode (or the first node N1) of the first transistor M1, a second electrode of the third transistor M3 may be connected to the second electrode (or the third node N3) of the first transistor M1, and a gate electrode of the third transistor M3 may be connected to the compensation gate line GCLn. The third transistor M3 may be referred to as a compensation transistor. The third transistor M3 may be turned on when a compensation gate signal is supplied to the compensation gate line GCLn to electrically connect the first node N1 and the third node N3. Therefore, when the third transistor M3 is turned on, the first transistor M1 may be connected in a diode form.

A first electrode of the fourth transistor M4 may be connected to the gate electrode (or the first node N1) of the first transistor M1, a second electrode of the fourth transistor M4 may be connected to a first initialization line VINTL1 (or a third power line), and a gate electrode of the fourth transistor M4 may be connected to the initialization gate line GILn. The fourth transistor M4 may be referred to as an initialization transistor. The fourth transistor M4 may be turned on when an initialization gate signal is supplied to the initialization gate line GILn to connect the first node N1 to the first initialization line VINTL1.

A first electrode of the fifth transistor M5 may be connected to the first power supply line VDD, a second electrode of the fifth transistor M5 may be connected to the first electrode (or the second node N2) of the first transistor M1, and a gate electrode of the fifth transistor M5 may be connected to the emission gate line EMLn. The fifth transistor M5 may be referred to as a first light emitting transistor.

A first electrode of the sixth transistor M6 may be connected to the second electrode (or the third node N3) of the first transistor M1, a second electrode of the sixth transistor M6 may be connected to a first electrode (or an anode electrode) of the light emitting element LD, and a gate electrode of the sixth transistor M6 may be connected to the emission gate line EMLn. The sixth transistor M6 may be referred to as a second light emitting transistor.

The fifth transistor M5 and the sixth transistor M6 may be turned off when an emission gate signal of a turn-off level is supplied to the emission gate line EMLn, and may be turned an when an emission gate signal of a turn-on level is supplied to the emission gate line EMLn.

A first electrode of the seventh transistor M7 may be connected to the first electrode of the light emitting element LD, a second electrode of the seventh transistor M7 may be connected to a second initialization line VINTL2 (or a fourth power line), and a gate electrode of the seventh transistor M7 may be connected to the bias control line GBLn. The seventh transistor M7 may be referred to as a bias transistor. The seventh transistor M7 may be turned on when a bias gate signal is supplied to the bias control line GBLn to connect the first electrode of the light emitting element LD to the second initialization line VINTL2.

A first electrode of the eighth transistor M8 may be connected to the second node N2, a second electrode of the eighth transistor M8 may be connected to a bias power line VBIAS, and a gate electrode of the eighth transistor M8 may be connected to the bias control line GBLn. The eighth transistor M8 may be turned on when a bias gate signal is supplied to the bias gate line GBLn to connect the second node N2 to the bias power line VBIAS. When a voltage of the bias power line VBIAS is periodically applied to the second node N2 (or the first electrode of the first transistor M1), the first transistor M1 may maintain a specific on-bias state to control a current amount of a driving current flowing through the light emitting element LD to be substantially constant. According to an operation of the eighth transistor M8, the pixel PXnm may emit light with a constant luminance regardless of the driving frequency (or refresh rate) of the display device 1 (refer to FIG. 1), and the pixel PXnm may operate at a high frequency.

The storage capacitor Cst may be formed or connected between the first power supply line VDD and the gate electrode (or the first node N1) of the first transistor M1. For example, a first electrode of the storage capacitor Cst may be connected to the first power supply line VDD, and a second electrode of the storage capacitor Cst may be connected to the gate electrode of the first transistor M1. The storage capacitor Cst may store the data voltage and a voltage corresponding to a threshold voltage of the first transistor M1 (for example, a voltage in which the threshold voltage of the first transistor M1 is reflected in the data voltage).

The first electrode of the light emitting element LD may be connected to the second electrode of the sixth transistor M6, and a second electrode (or a cathode electrode) of the light emitting element LD may be connected to the second power supply line VSS. The light emitting element LD may generate light of a predetermined luminance in response to the current supplied from the first transistor M1.

The light emitting element LD may be, for example, an organic light emitting diode, or an inorganic light emitting diode such as a micro light emitting diode (LED) or a quantum dot light emitting diode. In addition, the light emitting element LD may be a light emitting element in which an organic material and an inorganic material are combined. In FIG. 3, the pixel PXnm includes a single light emitting element LD, but the disclosure is not limited thereto. For example, in an embodiment, the pixel PXnm may include a plurality of light emitting elements, and the plurality of light emitting elements may be connected in series, in parallel, or in series-parallel with each other.

A voltage applied to the first power supply line VDD may be set to be higher than voltages applied to the first initialization line VINTL1, the second initialization line VINTL2, and the second power supply line VSS.

The first, second, fifth, sixth, seventh, and eighth transistors M1, M2, M5, M6, M7, and M8 may be P-type transistors. Channels of the first, second, fifth, sixth, seventh, and eighth transistors M1, M2, M5, M6, M7 and M8 may be formed of poly silicon. A poly silicon transistor may be a low temperature poly silicon (LTPS) transistor. The poly silicon transistor has high electron mobility, and thus has a fast driving characteristic.

The third and fourth transistors M3 and M4 may be N-type transistors. Channels of the third and fourth transistors M3 and M4 may be formed of an oxide semiconductor. An oxide semiconductor transistor has low charge mobility compared to poly silicon. Therefore, an amount of leakage current generated in a turn-off state of the oxide semiconductor transistors is less than that of the poly silicon transistor.

Figure 15:
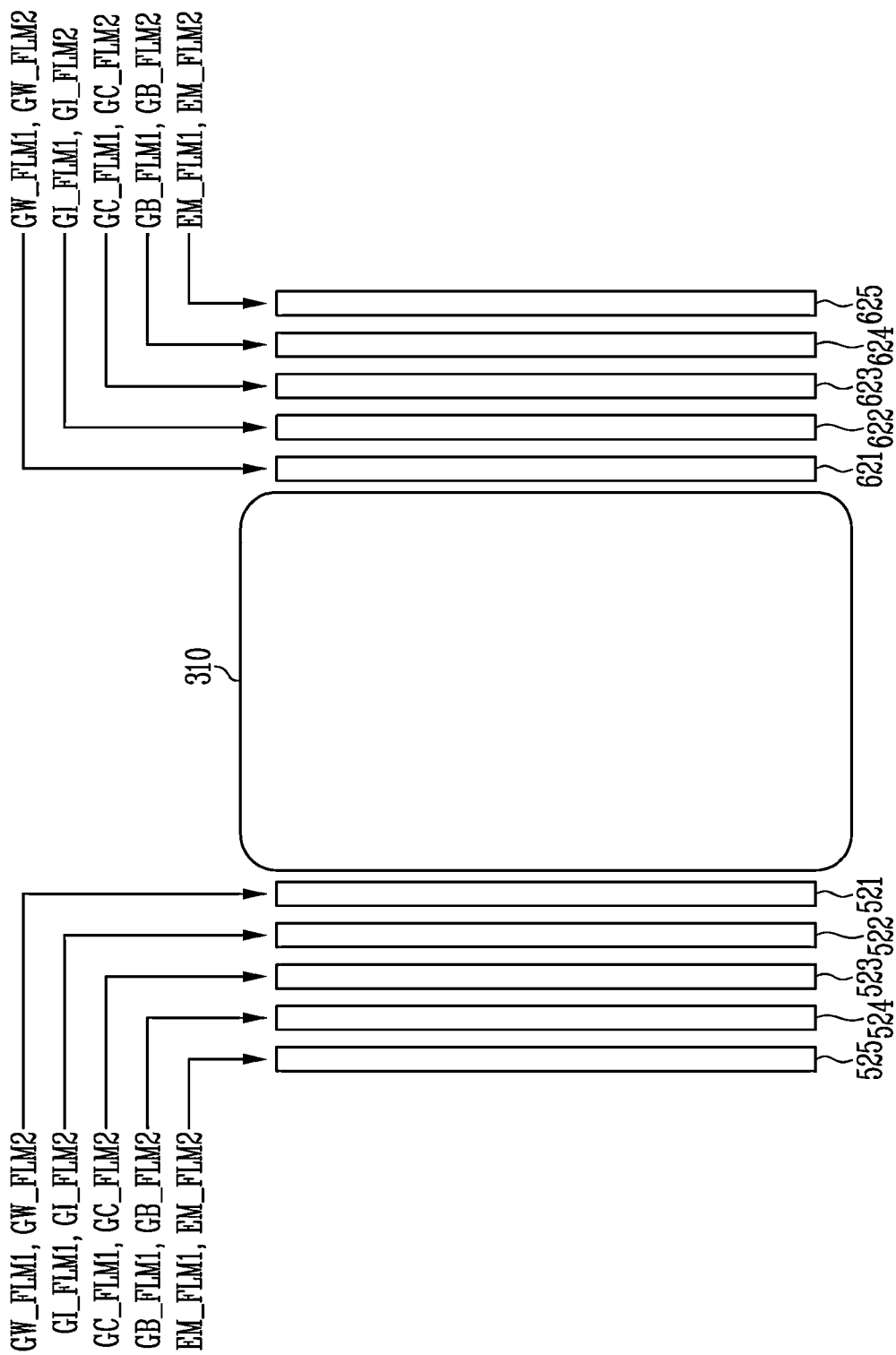
FIG. 15 is a diagram illustrating an embodiment of the gate driver of FIG. 3.

FIG. 15 is a diagram illustrating an embodiment of the gate driver of FIG. 3. For convenience of description, the display panel 310 is further shown in FIG. 15 in addition to the gate driver.

Referring to FIGS. 1 to 6 and 15, to drive the pixel PXnm of FIG. 14, the gate driver 320 (refer to FIG. 3) may include first gate drivers 521 to 525. In addition, as described with reference to FIGS. 4 and 5, the gate driver 320 (refer to FIG. 3) may further include second gate drivers 621 to 625.

The first gate drivers 521 to 525 may be disposed adjacent to one side of the display panel 310, and each of the first gate drivers 521 to 525 may include the first gate driver 421 and the second gate driver 422 of FIG. 5.

The second gate drivers 621 to 625 may be disposed adjacent to another side of the display unit 110, and each of the second gate drivers 621 to 625 may include the third gate driver 423 and the fourth gate driver 424 of FIG. 5.

Each of the first write gate driver 521 and the second write gate driver 621 may generate the write gate signal described with reference to FIG. 14 based on a first write start signal GW_FLM1 and a second write start signal GW_FLM2.

Each of the first initialization gate driver 522 and the second initialization gate driver 622 may generate the initialization gate signal described with reference to FIG. 14 based on a first initialization start signal GI_FLM1 and a second initialization start signal GI_FLM2.

Each of the first compensation gate driver 523 and the second compensation gate driver 623 may generate the compensation gate signal described with reference to FIG. 14 based on a first compensation start signal GC_FLM1 and a second compensation start signal GC_FLM2.

Each of the first bias gate driver 524 and the second bias gate driver 624 may generate the bias gate signal described with reference to FIG. 14 based on a first bias start signal GB_FLM1 and a second bias start signal GB_FLM2.

Each of the first emission gate driver 525 and the second emission gate driver 625 may generate the emission gate signal described with reference to FIG. 14 based on a first emission start signal EM_FLM1 and a second emission start signal EM_FLM2.

As described above, the gate driver may include the first gate drivers 521 to 525, and may selectively use progressive scanning and interlaced scanning, each of the first gate drivers 521 to 525 may be implemented by including the first gate driver 421 and the second gate driver 422 of FIG. 5.

Figure 16:
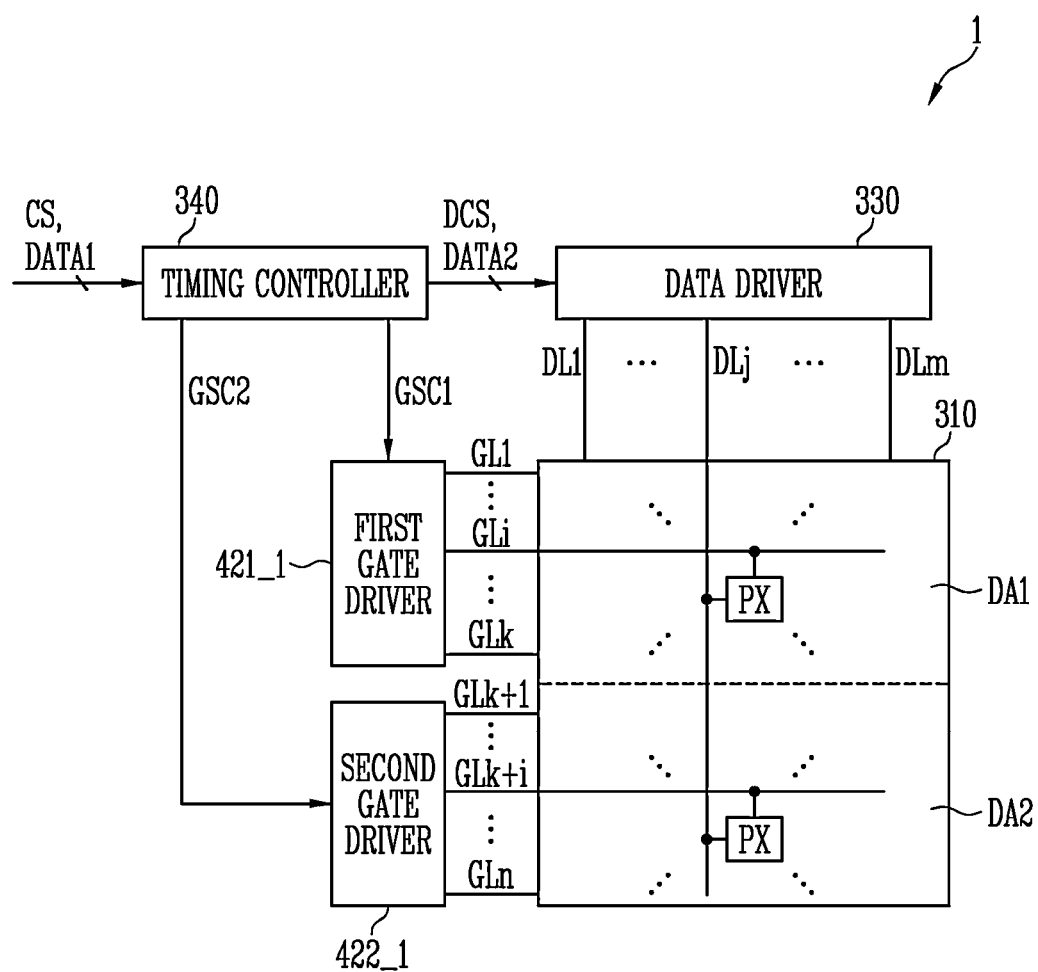
FIG. 16 is a diagram illustrating an embodiment of the display device of FIG. 3.

FIG. 16 is a diagram illustrating an embodiment of the display device of FIG. 3.

Referring to FIGS. 1, 3, 4, and 16, except for the first and second gate drivers 421_1 and 422_1, the display device 1 of FIG. 16 may be substantially identical or similar to the display device 1 of FIG. 4. Therefore, for convenience of explanation, a further description of components and technical aspects previously described may be omitted.

The display panel 310 may include a first display area DA1 (or a first area) and a second display area DA2 (or a second area). The first display area DA1 and the second display area DA2 may be separated from each other along a scan direction (or along an extension direction of the data lines DL1 to DLm).

The gate lines GL1 to GLn of FIG. 3 may include third gate lines GL1 to GLk (where k is a positive integer less than or equal to n) and fourth gate lines GLk+1 to GLn, corresponding to the first display area DA1 and the second display area DA2. In an embodiment, k may be n/2. However, k is not limited thereto.

For example, the third gate lines GL1 to GLk may include a first gate line GL1, an i-th gate line GLi, and a k-th gate line GLk sequentially arranged to correspond to the first display area DA1. The third gate lines GL1 to GLk may be connected to the pixel PX of the first display area DA1.

The fourth gate lines GLk+1 to GLn may include a (k+1)-th gate line GLk+1, a (k+i)-th gate line GLk+1, and an n-th gate line GLn sequentially arranged to correspond to the second display area DA2. The fourth gate lines GLk+1 to GLn may be connected to the pixel PX of the second display area DA2.

The gate driver 320 of FIG. 3 may include a first gate driver 421_1 and a second gate driver 422_1.

The first gate driver 421_1 may generate a first gate signal (for example, a turn-on level of gate signal) based on a first gate control signal GCS1 (or a first scan control signal), and sequentially provide the first gate signal to the third gate lines GL1 to GLk. The first gate control signal GCS1 may include a first start signal and a first clock signal, and may be provided from the timing controller 340. The first gate driver 421_1 may include a shift register (or a stage) that sequentially outputs the first gate signal of a pulse form corresponding to the first start signal using the first clock signal (refer to FIG. 6).

Similarly, the second gate driver 422_1 may generate a second gate signal (for example, a turn-on level of gate signal) based on a second gate control signal GCS2 (or a second scan control signal), and sequentially provide the second gate signal to the fourth gate lines GLk+1 to GLn. The second gate control signal GCS2 may include a second start signal and a second clock signal, and may be provided from the timing controller 340. The second gate driver 422 may include a shift register (or a stage) that sequentially outputs the second gate signal of a pulse form corresponding to the second start signal using the second clock signal (refer to FIG. 6).

According to an embodiment, the embodiment of FIG. 5 may be applied to the embodiment of FIG. 16. For example, the gate driver 320 of FIG. 3 may further include a third gate driver and a fourth gate driver positioned on another side of the display panel 310 (that is, a side opposite to the one side of the display panel 310 in which the first gate driver 421_1 and the second gate driver 422_1 are positioned). In this case, the third gate driver and the fourth gate driver may perform the same functions as the first gate driver 421_1 and the second gate driver 422_1, respectively.

In an embodiment, in the first mode, the first gate driver 421_1 and the second gate driver 422_1 may continuously provide the gate signal to the gate lines GL1 to GLn.

In an embodiment, in the second mode, the first gate driver 421_1 and the second gate driver 422_1 may discontinuously provide the gate signal to the gate lines GL1 to GLn. For example, the first gate driver 421_1 may provide the first gate signal to the third gate lines GL1 to GLk, and after a predetermined time elapses, the second gate driver 422_1 may provide the second gate signal to the fourth gate lines GLk+1 to GLn.

Figure 17:
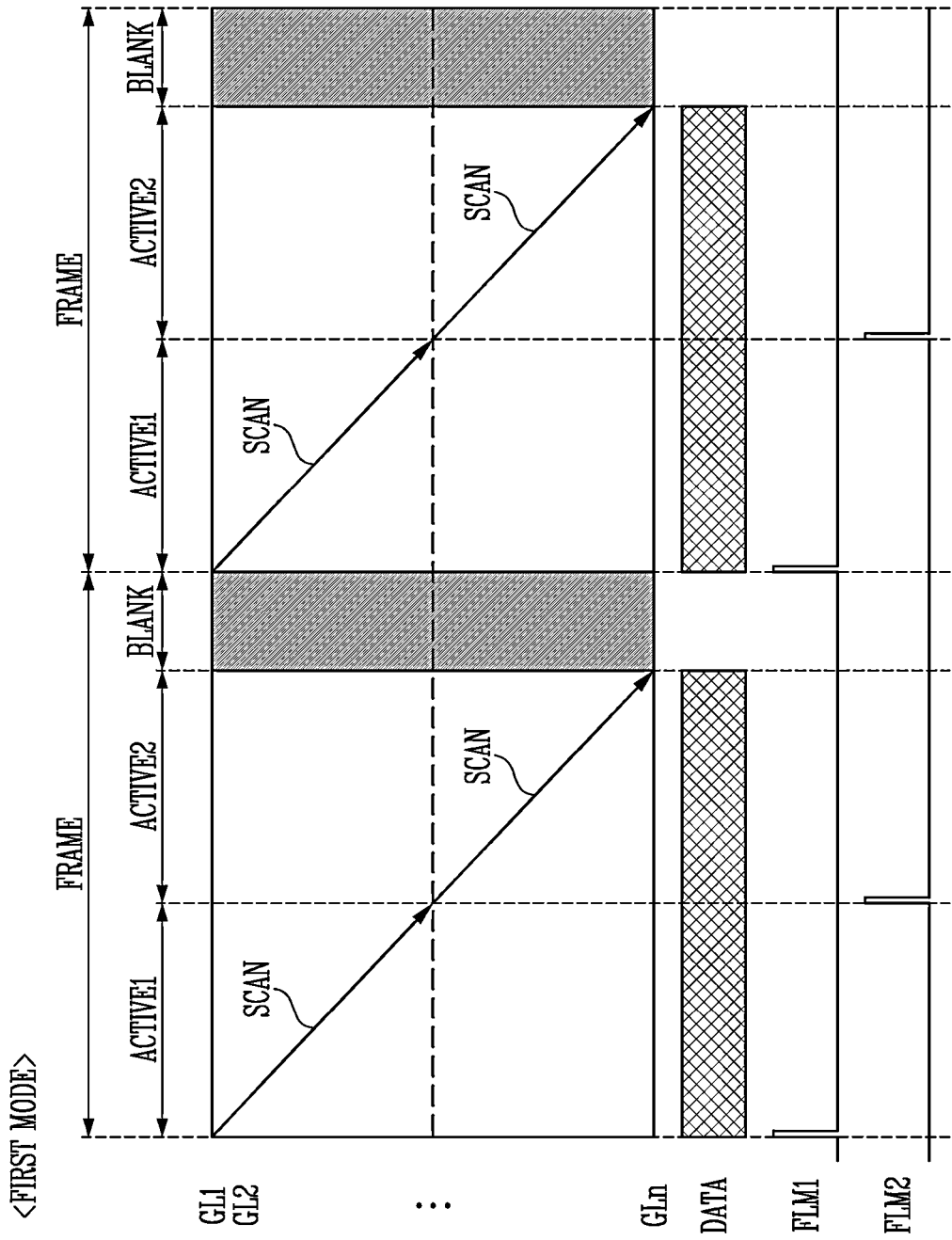
FIG. 17 is a diagram illustrating the operation in the first mode of the display device of FIG. 16 according to an embodiment of the disclosure.

FIG. 17 is a diagram illustrating the operation in the first mode of the display device of FIG. 16 according to an embodiment of the disclosure.

Referring to FIGS. 1, 7, 16, and 17, the first start signal FLM1, the second start signal FLM2, and the data signal DATA may be substantially identical or similar to the first start signal FLM1, the second start signal FLM2, and the data signal DATA. Accordingly, for convenience of explanation, a further description thereof will be omitted.

In the first mode, the frame FRAME may include the first active period ACTIVE1, the second active period ACTIVE2, and the blank period BLANK. In the first mode, the first active period ACTIVE1 and the second active period ACTIVE2 may be adjacent (e.g., directly adjacent to each other), and a separate period (for example, the blank period BLANK) is not allocated between the first active period ACTIVE1 and the second active period ACTIVE2.

In the first active period ACTIVE1, the first start signal FLM1 may have a turn-on pulse, and the first gate driver 421_1 may sequentially provide the first gate signal to the third gate lines GL1 to GLk (refer to FIG. 16).

In the second active period ACTIVE2, the second start signal FLM2 may have a turn-on pulse, and the second gate driver 422_1 may sequentially provide the second gate signal to the fourth gate lines GLk+1 to GLn (refer to FIG. 16). For example, at an end time point of the first active period ACTIVE1, the second start signal FLM2 may have the turn-on pulse, and thus, the gate signal may be provided to the gate lines GL1 to GLn substantially without interruption (or continuously).

In the blank period BLANK, the sensor unit 120 (refer to FIG. 1) (and the sensor driver 220 (refer to FIG. 1)) may drive and sense the touch input. For example, in the blank period BLANK, the sensor driver 220 may receive or sample the sensing signal output through the sensor unit 120.

Figure 18:
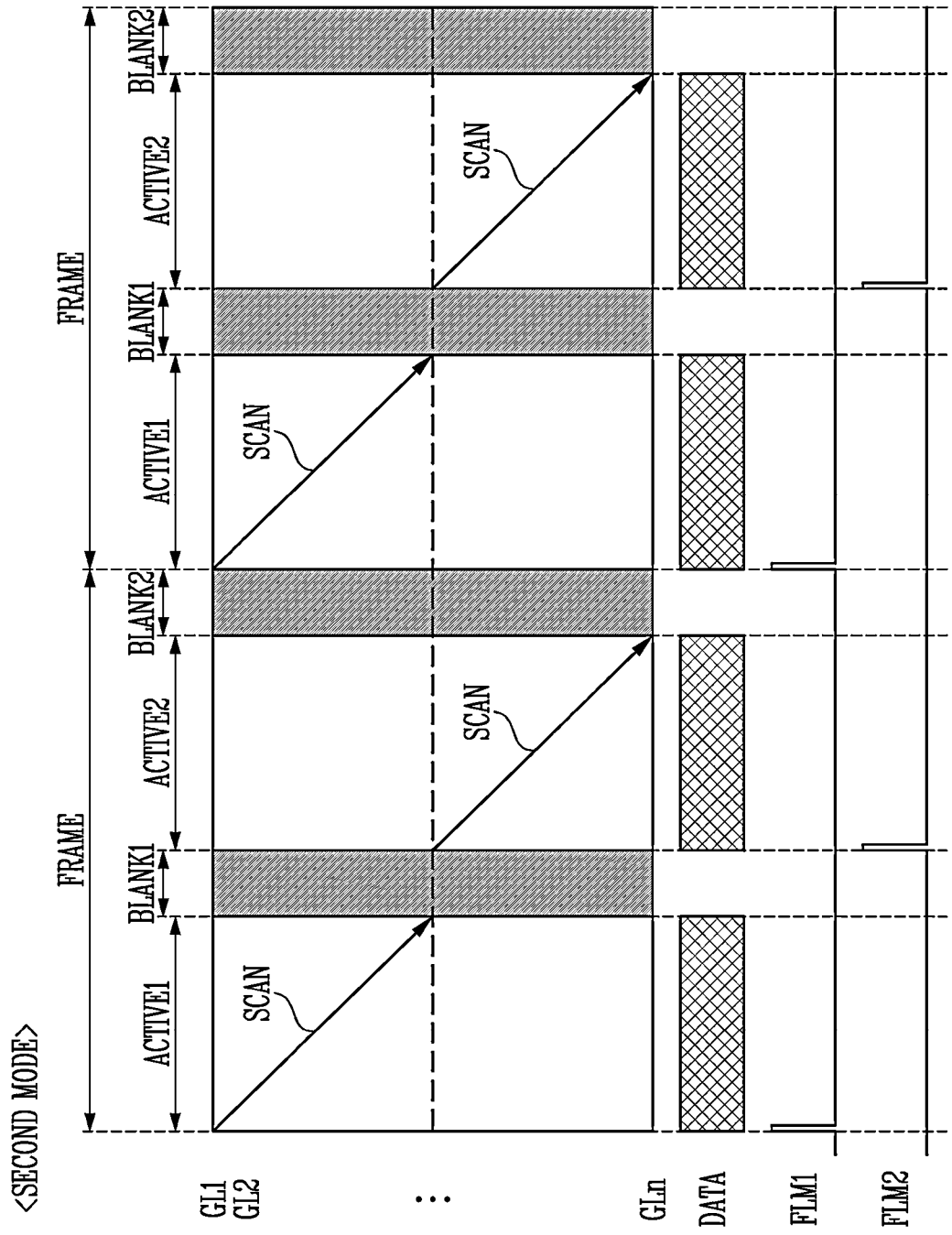
FIG. 18 is a diagram illustrating the operation in the second mode of the display device of FIG. 16 according to an embodiment of the disclosure.

FIG. 18 is a diagram illustrating the operation in the second mode of the display device of FIG. 16 according to an embodiment of the disclosure.

Referring to FIGS. 1, 10, and 16 to 18, in the second mode, the frame FRAME may include the first active period ACTIVE1 (or the first period), the first blank period BLANK1 (or the second period), the second active period ACTIVE2 (or the third period), and the second blank period BLANK2 (or the fourth period) sequentially arranged. Since the first active period ACTIVE1, the first blank period BLANK1, the second active period ACTIVE2, and the second blank period BLANK2 of FIG. 18 are substantially identical or similar to the first active period ACTIVE1, the first blank period BLANK1, the second active period ACTIVE2, and the second blank period BLANK2 of FIG. 1, for convenience of explanation, a further description thereof will be omitted.

The first start signal FLM1 may have a turn-on pulse at a start time point of the first active period ACTIVE1 or an end time point of the second blank period BLANK2.

To prevent a display operation from being performed during the first blank period BLANK1, the second start signal FLM2 may have a turn-on pulse, after a predetermined time elapses from the end time point of the first active period ACTIVE1, rather than at the end time point of the first active period ACTIVE1. For example, after the first blank period BLANK1 elapses from the end time point of the first active period ACTIVE1, that is, at the start time point of the second active period ACTIVE2 or the end time point of the first blank period BLANK1, the second start signal FLM2 may have the turn-on pulse.

The sensing operation for the touch input may be performed in each of the first blank period BLANK1 and the second blank period BLANK2. For example, in each of the first blank period BLANK1 and the second blank period BLANK2, the sensor unit 120 (refer to FIG. 1) (and the sensor driver 220 (refer to FIG. 1)) may drive and sense the touch input. That is, the driving period in the second mode of the sensor unit 120 (refer to FIG. 1) (and the sensor driver 220 (refer to FIG. 1)) may be different from the driving period in the first mode. For example, the driving period in the second mode may be shorter than the driving period in the first mode, and the number of times the touch input is sensed (or a report rate) in the second mode may be greater than the number of times the touch input is sensed in the first mode.

Therefore, the display device 1 (refer to FIG. 1) may maintain the refresh rate of the image, avoid interference with the display unit 110 (refer to FIG. 1) (and degradation of display quality due to the interference), and perform the sensing operation for the touch input at a higher driving frequency.

Figure 19:
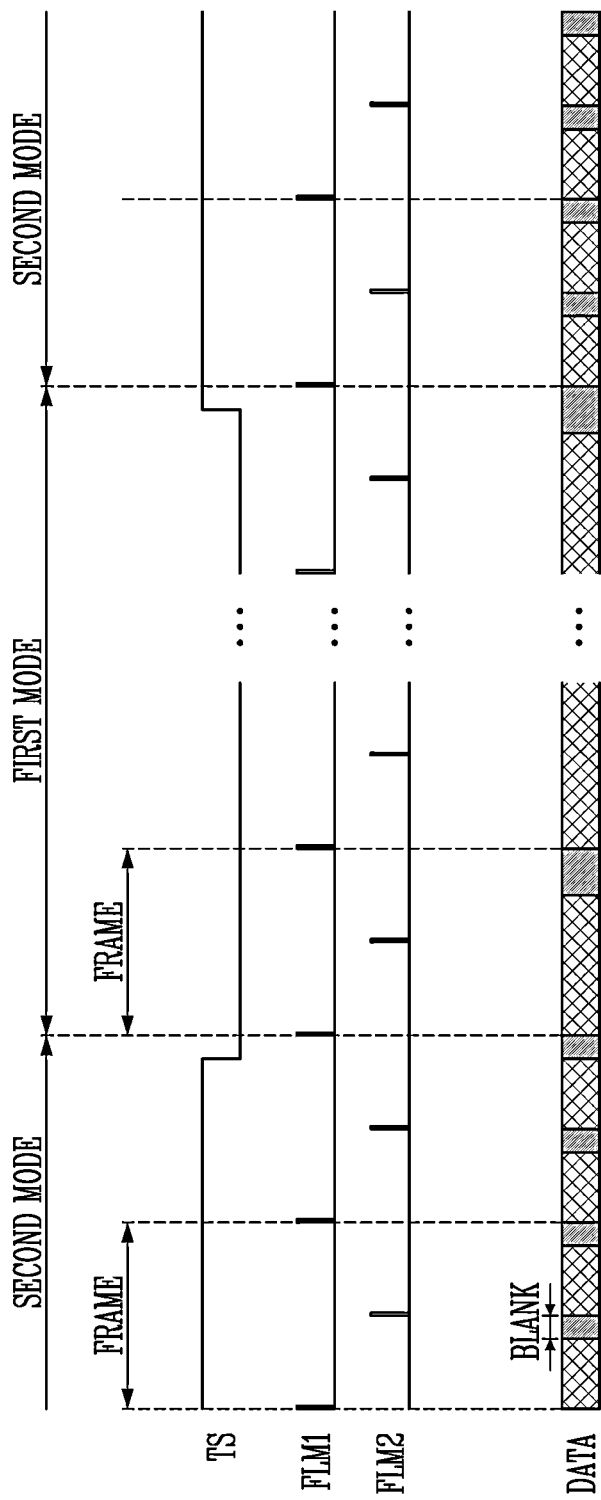
FIG. 19 is a diagram illustrating the operation of the display device of FIG. 1 according to an embodiment of the disclosure.

FIG. 19 is a diagram illustrating the operation of the display device of FIG. 1 according to an embodiment of the disclosure. In FIG. 19, some signals are shown based on mode switching between the first mode and the second mode of the display device 1 of FIG. 1.

Referring to FIGS. 1, 12, and 16 to 19, since the touch signal TS, the first start signal FLM1, the second start signal FLM2, and the data signal DATA of FIG. 19 are substantially identical or similar to the touch signal TS, the first start signal FLM1, the second start signal FLM2, and the data signal DATA, for convenience of explanation, a further description thereof will be omitted.

When the touch signal TS has or maintains the low level, the display device 1 (refer to FIG. 1) may perform the mode switching from the second mode to the first mode or may maintain the first mode.

As described with reference to FIG. 17, in the first mode, the display device 1 may continuously output the gate signal. To this end, the first start signal FLM1 and the second start signal FLM2 may have the turn-on pulse in one period (or one continuous active period).

In the first mode, the frame FRAME may include one blank period BLANK, and the touch scan operation may be performed in the blank period BLANK.

When the touch signal TS has or maintains the high level, the display device 1 may perform the mode switching from the first mode to the second mode or may maintain the second mode.

As described above with reference to FIG. 18, in the second mode, the display device 1 may discontinuously output the gate signal. To this end, the second start signal FLM2 may have the turn-on pulse at a time point when about ½ of the frame FRAME elapses from a time point when the first start signal FLM1 has the turn-on pulse.

In the second mode, the frame FRAME may include two blank periods BLANK, and the touch scan operation may be performed in the blank periods BLANK.

The size (or the time) of the frame FRAME in the second mode may be substantially the same as the size of the frame FRAME in the first mode. For example, in the first mode, the frame FRAME may be about $1/120$ second, and similarly, in the second mode, the frame FRAME may also be about $1/120$ second. That is, the refresh rate of the image in the second mode may be about the same as the refresh rate of the image in the first mode.

As described above, the display device 1 may perform the mode switching between the first mode and the second mode based on whether interlocked with the external input device or whether the touch input occurs, and may vary the number of blank periods BLANK (that is, periods in which the touch scan operation may be performed) in one frame FRAME. Therefore, the display device 1 may sense the touch input at a higher driving frequency and display a touch input result more quickly and naturally.

Figure 20:
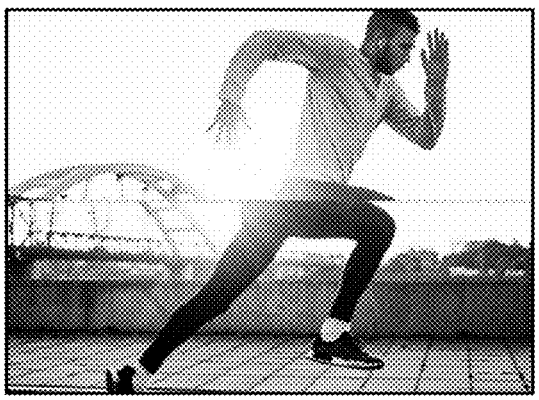
FIG. 20 is a diagram illustrating an image displayed on a display device according to a comparative example and an image displayed on the display device of FIG. 1 according to an embodiment of the disclosure.
Figure 20:
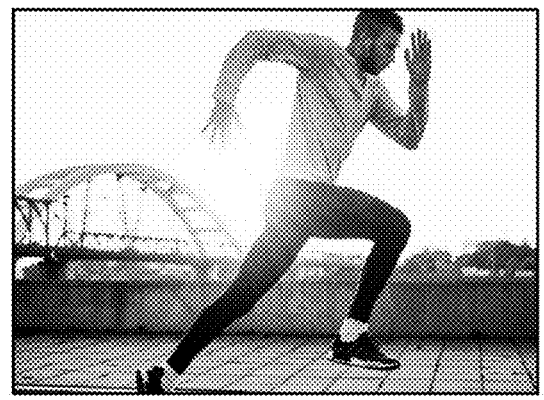

FIG. 20 is a diagram illustrating an image displayed on a display device according to a comparative example and an image displayed on the display device of FIG. 1 according to an embodiment of the disclosure.

Referring to FIGS. 1, 13, and 16 to 20, a third image IMAGE3 represents an image displayed on a display device according to a comparative example, and the second image IMAGE2 may represent the image displayed on the display device 1 of FIG. 1 according to an embodiment of the disclosure.

It is assumed that the display device according to the comparative example operates only in the second mode described with reference to FIG. 18. As described with reference to FIG. 18, the first blank period BLANK1 may be inserted between the first active period ACTIVE1 and the second active period ACTIVE2. When the display device displays an image (for example, a moving image) having many changes between the frames FRAME, due to latency corresponding to the first blank period BLANK1, the third image IMAGE3 of the first mode may be discontinuously displayed.

Since the display device 1 according to embodiments of the disclosure continuously performs the scanning operation in the first mode, discontinuity of the image may be prevented or reduced, as shown in the second image IMAGE2.

While the disclosure has been particularly shown and described with reference to embodiments thereof, it will be understood by those of ordinary skill in the art that various changes in form and detail may be made therein without departing from the spirit and scope of the disclosure as defined by the following claims.

What is claimed is:

1. A display device, comprising:
 a display panel including pixels connected to gate lines and data lines;
 a sensor that overlaps the display panel; and
 a gate driver configured to provide a gate signal to the gate lines,
 wherein in a first mode, the gate driver provides the gate signal to the gate lines using progressive scanning, and wherein in a second mode, the gate driver provides the gate signal using interlaced scanning, and the sensor operates in a period allocated between periods in which a first interlaced scanning operation and a second interlaced scanning operation are performed within one frame period, wherein the gate driver operates in the second mode when an input device interlocked with the sensor is activated, and wherein the gate driver operates in the first mode when the input device is deactivated.

2. The display device of claim 1, wherein the gate lines include first gate lines and second gate lines which are alternately arranged, and the gate signal includes a first gate signal and a second gate signal, wherein the gate driver comprises:
a first gate driver configured to sequentially provide the first gate signal to the first gate lines in response to a first start signal; and
a second gate driver configured to sequentially provide the second gate signal to the second gate lines in response to a second start signal, wherein the first gate signal is sequentially provided to the first gate lines in a first period of the second mode, and the second gate signal is sequentially provided to the second gate lines in a second period of the second mode after the first period.

3. The display device of claim 2, wherein the first gate lines are odd-numbered gate lines, and the second gate lines are even-numbered gate lines.

4. The display device of claim 2, wherein a pulse of the first start signal and a pulse of the second start signal are generated in different periods in the second mode.

5. The display device of claim 4, wherein the pulse of the first start signal and the pulse of the second start signal are generated in a same period in the first mode.

6. The display device of claim 1, wherein the gate driver operates in the second mode when the sensor senses a touch input, and wherein the gate driver operates in the first mode when the sensor does not sense the touch input.

7. The display device of claim 1, wherein a frame period of the second mode includes a first period, a second period, a third period, and a fourth period sequentially arranged, wherein the first interlaced scanning operation is performed in the first period, and the second interlaced scanning operation is performed in the third period, and wherein the sensor operates in the second period and the fourth period.

8. The display device of claim 7, wherein a second driving period of the sensor in the second mode is different from a first driving period of the sensor in the first mode.

9. The display device of claim 1, wherein the gate driver generates the gate signal based on a clock signal, and wherein a second frequency of the clock signal in the second mode is different from a first frequency of the clock signal in the first mode.

10. The display device of claim 9, wherein the second frequency of the clock signal in the second mode is greater than the first frequency of the clock signal in the first mode.

11. A display device, comprising:
a display panel including pixels connected to gate lines and data lines;
a sensor that overlaps the display panel; and
a gate driver configured to provide a gate signal to the gate lines, wherein in a first mode, the gate driver provides the gate signal to the gate lines using progressive scanning, wherein in a second mode, the gate driver provides the gate signal using interlaced scanning, and the sensor operates in a period allocated between periods in which a first interlaced scanning operation and a second interlaced scanning operation are performed within one frame period, wherein the gate driver generates the gate signal based on a clock signal, wherein a second frequency of the clock signal in the second mode is different from a first frequency of the clock signal in the first mode, wherein the second frequency of the clock signal in the second mode is greater than the first frequency of the clock signal in the first mode, and wherein a pulse width of the clock signal in the second mode is the same as a pulse width of the clock signal in the first mode.

12. The display device of claim 10, wherein a pulse width of the clock signal in the second mode is different from a pulse width of the clock signal in the first mode.

13. The display device of claim 1, wherein a refresh rate of an image displayed through the display panel is the same in the first mode and in the second mode.

14. A display device, comprising:
a display panel including pixels connected to gate lines and data lines;
a sensor that overlaps the display panel; and
a gate driver configured to provide a gate signal to the gate lines, wherein the gate lines are divided into first gate lines disposed in a first area of the display panel and second gate lines disposed in a second area of the display panel, wherein the first area and the second area are physically separated along a horizontal direction of the display panel, the first gate lines are sequentially arranged in the first area, and the second gate lines are sequentially arranged in the second area, wherein in a first mode, the gate driver provides the gate signal to the gate lines during one continuous period within a frame period, and the sensor does not operate during the one continuous period, wherein in a second mode, the gate driver provides the gate signal to the first gate lines in a first period within one frame period, and provides the gate signal to the second gate lines in a third period within the one frame period, and the sensor operates in a second period between the first period and the third period.

15. The display device of claim 14, wherein the gate driver operates in the second mode when the sensor senses a touch input, and wherein the gate driver operates in the first mode when the sensor does not sense the touch input.

16. The display device of claim 14, wherein the gate driver operates in the second mode when an input device interlocked with the sensor is activated, and wherein the gate driver operates in the first mode when the input device is deactivated.

17. The display device of claim 14, wherein a frame period of the second mode includes the first period, the second period, the third period, and a fourth period sequentially arranged, wherein a scanning operation is performed in the first period and the third period, and wherein the sensor operates in the second period and the fourth period.

18. The display device of claim 17, wherein a second driving period of the sensor in the second mode is different from a first driving period of the sensor in the first mode.

19. The display device of claim 14, wherein a refresh rate of an image displayed through the display panel is about the same in the first mode and the second mode.

\* \* \* \* \*